US012208999B2

(12) United States Patent
Schoonmaker et al.

(10) Patent No.: US 12,208,999 B2
(45) Date of Patent: Jan. 28, 2025

(54) LOCKING HEAD ASSEMBLY FOR CRANE BOOM PINS, BOOM WITH SUCH AN ASSEMBLY AND CRANE WITH SUCH A BOOM

(71) Applicant: MANITOWOC CRANE COMPANIES, LLC, Milwaukee, WI (US)

(72) Inventors: Stephen J. Schoonmaker, Chambersburg, PA (US); John F. Benton, Smithsburg, MD (US); Bradley C. Calaman, Carlisle, PA (US); Martin R. Stander, Greencastle, PA (US); Jared Yorke, Falling Waters, WV (US)

(73) Assignee: Manitowoc Crane Companies, LLC, Milwaukee, WI (US)

( * ) Notice: Subject to any disclaimer, the term of this patent is extended or adjusted under 35 U.S.C. 154(b) by 384 days.

(21) Appl. No.: 17/619,199

(22) PCT Filed: Jun. 24, 2020

(86) PCT No.: PCT/US2020/039384
§ 371 (c)(1),
(2) Date: Dec. 14, 2021

(87) PCT Pub. No.: WO2020/263998
PCT Pub. Date: Dec. 30, 2020

(65) Prior Publication Data
US 2022/0242703 A1 Aug. 4, 2022

Related U.S. Application Data

(60) Provisional application No. 62/880,473, filed on Jul. 30, 2019, provisional application No. 62/865,724, filed on Jun. 24, 2019.

(51) Int. Cl.
*B66C 23/70* (2006.01)

(52) U.S. Cl.
CPC .......... *B66C 23/708* (2013.01); *B66C 23/705* (2013.01); *B66C 23/707* (2013.01); *B66C 2700/0378* (2013.01)

(58) Field of Classification Search
CPC .... B66C 23/708; B66C 23/705; B66C 23/707
See application file for complete search history.

(56) References Cited

U.S. PATENT DOCUMENTS 2,309,588 A * 1/1943 Hillix ...................... B24B 35/00 451/450
3,154,206 A * 10/1964 Gillette, Jr. ............. B66C 23/48 254/2 R (Continued)

FOREIGN PATENT DOCUMENTS

CN 102730578 A * 10/2012 ........... B66C 23/708
CN 105179374 A 12/2015

(Continued)

OTHER PUBLICATIONS

Machine Translation of CN 102730578A (Year: 2012).*

(Continued)

*Primary Examiner* — Michael R Mansen
*Assistant Examiner* — Juan J Campos, Jr.
(74) *Attorney, Agent, or Firm* — Cook Alex Ltd.

(57) ABSTRACT

A locking head assembly (210) for a telescoping boom (118) of a crane (110) includes a locking head (212) having a base (218), an operating plate (220) operably coupled to the base, one or more cylinder pins (222) and/or one or more section lock arms (226) movable in response to movement of the operating plate relative to the base. An actuator (214) is operably coupled to the operating plate and configured to move the operating plate relative to the base. The actuator (Continued)

includes a motor (234) and a drive arm (236). The motor is configured to drive the drive arm between a drive arm first position and a drive arm second position. A motion mitigator (216) is connected to the actuator and the locking head and includes a housing (238), a rod (240) movable relative to the housing, and a biasing device (242) disposed between the rod and the housing.

21 Claims, 24 Drawing Sheets

(56) References Cited

U.S. PATENT DOCUMENTS 4,303,165 A * 12/1981 Cassens ................ B66C 23/702 52/118
5,183,305 A * 2/1993 Nordstrom .............. B66C 1/102 294/81.1
5,628,416 A 5/1997 Frommelt et al.
9,637,359 B2 5/2017 Klein et al.
2015/0041422 A1 2/2015 Kaupert et al.
2015/0128735 A1 5/2015 Klein et al.

FOREIGN PATENT DOCUMENTS

DE 1022344 B4 1/1958
DE 102011116083 A1 * 4/2013 ........... B66C 23/708

OTHER PUBLICATIONS

Machine Translation of DE 102011116083A1 (Year: 2013).*
Extended European Search Report issued in EP Appl. No. 20181443.1 on Nov. 23, 2020 (8 pages).
WPI Database Clarivate Analytics, 2017 (1 page).
International Search Report and Written Opinion issued in PCT/US2020/039384 on Sep. 29, 2020.

* cited by examiner

LOCKING HEAD ASSEMBLY FOR CRANE BOOM PINS, BOOM WITH SUCH AN ASSEMBLY AND CRANE WITH SUCH A BOOM

BACKGROUND

The following description relates generally to a telescoping boom of a crane, for example, a pinned boom.

A crane having a telescoping boom includes a mechanical locking head having coupling pins and lock arms configured for selective engagement with and disengagement from portions of a telescoping section of the boom. The mechanical locking head is mounted on a linear boom actuator configured to extend and retract individual telescoping sections of the boom. To this end, the coupling pins are configured to engage a telescoping section to drive the telescoping section to extend or retract with movement of the linear boom actuator. Conversely, the coupling pins may disengage the telescoping section to allow for movement of the linear boom actuator and the mechanical locking head relative to the boom sections. Accordingly, the mechanical locking head may be repositioned to engage a different telescoping section.

The lock arms are configured to engage a section lock on a telescoping section of the boom. The lock arms are operable to move the section lock between a locked position in which telescoping movement of the telescoping section relative to an adjacent boom section is restricted, and an unlocked position in which telescoping movement of the telescoping section relative to an adjacent boom section is permitted. Thus, with the coupling pins engaged in a telescoping section and the section lock in an unlocked position, the linear boom actuator may drive movement of the telescoping section to extend or retract the boom. Upon reaching a desired position, the lock arms can be moved to the locking position to lock the section locks and substantially prevent telescoping movement of the telescoping section relative to an adjacent boom section. The coupling pins may then be disengaged from the telescoping section to allow repositioning of the mechanical locking head.

A known linear boom actuator is formed as a telescoping rod-cylinder assembly, having a fixed rod and a movable cylinder. The mechanical locking head is disposed on the cylinder. The coupling pins and the lock arms are hydraulically actuated by way of a hydraulic trombone cylinder within the rod. However, operation of the hydraulic trombone cylinder may be adversely affected by entrained air and/or cold temperatures. Moreover, pressure within the trombone cylinder may deflect the rod or cylinder and cause the coupling pins or lock arms to become stuck. Boom operations may be delayed while correcting this issue.

US Pat. Appl. Pub. No. 2015/0128735 discloses a drive of a sliding connecting member of a locking system of a telescoping system having an outer telescopic section and an inner telescoping section each provided with a locking hole into which a locking bolt can be inserted and withdrawn via the sliding connecting member. The locking bolt is moveable by an engagement member running in the sliding path in such a way that the locking bolt effects a linear movement and the boom sections can be connected to one another by insertion of the locking bolt into the bolting hole and the sliding connecting member can be driven by a linear electric drive.

However, even with the linear electric drive above, situations still arise in which coupling pins and/or lock arms may become stuck. In such situations, movement of the linear electric drive is restricted as well. A control system connected to the electric linear drive may continue attempted operations of the drive. However, such attempts may damage or cause premature or excess wear of the linear electric drive when movement of the drive is inhibited.

It is therefore desirable to provide locking head assembly for a telescoping boom which incorporates a motion mitigator to take up movements of an actuator when movement of cylinder pins and/or section arms of a locking head are impeded.

SUMMARY

According to one aspect, a locking head assembly for a telescoping boom includes a locking head having a base, an operating plate operably coupled to the base, one or more cylinder pins and/or one or more section lock arms operably coupled to the operating plate and movable in response to movement of the operating plate relative to the base. The locking head assembly also includes an actuator operably coupled to the operating plate and configured to move the operating plate relative to the base. The actuator includes a motor and a drive arm. The motor is configured to move the drive arm between an arm first position and an arm second position. The locking head assembly further includes a motion mitigator operably connected to the actuator and the locking head. The motion mitigator includes a housing, a rod disposed at least partially within the housing, and a biasing device disposed between the rod and the housing.

The one or more cylinder pins may be moved between a retracted pin position and an extended pin position in response to movement of the operating plate relative to the base. The one or more section lock arms may be moved between a locking position and an unlocking position in response to movement of the operating plate relative to the base.

In an embodiment, the motion mitigator may be connected to and between the operating plate and the drive arm. The motion mitigator may be in a rigid condition when the operating plate moves in response to movement of the drive arm. The motion mitigator may be in a first loaded condition when movement of the operating plate in the first direction is inhibited in response to movement of the drive arm in the first direction. The rod may be in a retracted position relative to the housing and the biasing device may urge the operating plate in the first direction when the motion mitigator is in the first loaded condition. The motion mitigator may be in a second loaded condition when movement of the operating plate in the second direction is inhibited in response to movement of the drive arm in the second direction. The rod may be in an extended position relative to the housing and the biasing device may urge the operating plate in the second direction when the motion mitigator is in the second loaded condition.

In an embodiment, the locking head assembly may further include an auxiliary drive device connected to the actuator. The auxiliary drive device may be an auxiliary actuator having an auxiliary motor and an auxiliary drive arm. The actuator may be mounted on a track and configured for translational movement relative to the track in response to movement of the auxiliary drive arm.

According to another aspect, a telescoping boom for a crane includes a base section, a plurality of telescope sections movable relative to the base section to adjust a length of the boom, and a boom actuator disposed within the base section operable to move a telescope section of the plurality of telescope sections to adjust the length of the boom. The telescoping boom also includes a locking head assembly connected to the boom actuator. The locking head assembly includes a locking head having a base, an operating plate operably coupled to the base, one or more cylinder pins and/or one or more section lock arms operably coupled to and movable in response to movement of the operating plate relative to the base. The locking head assembly also includes an actuator operably coupled to the operating plate and configured to move the operating plate relative to the base. The actuator includes a motor and a drive arm. The motor is configured to drive the drive arm between an arm first position and an arm second position. A motion mitigator is operably coupled to the actuator and the locking head and includes a housing, a rod disposed at least partially within the housing, and a biasing device disposed between the rod and the housing.

According to another aspect, a crane includes a carrier and a superstructure mounted on the carrier. The superstructure includes a telescoping boom having a base section, a plurality of telescope sections movable relative to the base section to adjust a length of the boom, and a boom actuator disposed within the base section operable to move a telescope section of the plurality of telescope sections to adjust the length of the boom. The crane also includes a locking head connected to the boom actuator. The locking head includes a base, an operating plate operably coupled to the base, one or more cylinder pins and/or one or more section lock arms operably connected to and movable in response to movement of the operating plate relative to the base. An actuator is operably mounted on the boom actuator, coupled to the operating plate, and configured to move the operating plate relative to the base. The actuator includes a motor and a drive arm. The motor is configured to drive the drive arm between an arm first position and an arm second position. A motion mitigator is operably coupled to the locking head and the actuator, and includes a housing, a rod disposed at least partially within the housing, and a biasing device disposed between the rod and the housing.

According to another aspect, a method for controlling a boom actuator of a telescoping boom includes detecting, with one or more position sensors, a position of an operating plate, comparing, by a controller, the detected position of the operating plate with an expected position of the operating plate, and determining, by the controller, whether the detected position of the operating plate is the same as the expected position of the operating plate. If the detected position of the operating plate is not the same as the expected position of the operating plate, the method further includes controlling the hydraulic rod-cylinder assembly to perform a corrective operation until the operating plate is detected at the expected position. The operating plate moves to the expected position under a biasing force from a motion mitigator operably coupled to the operating plate.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
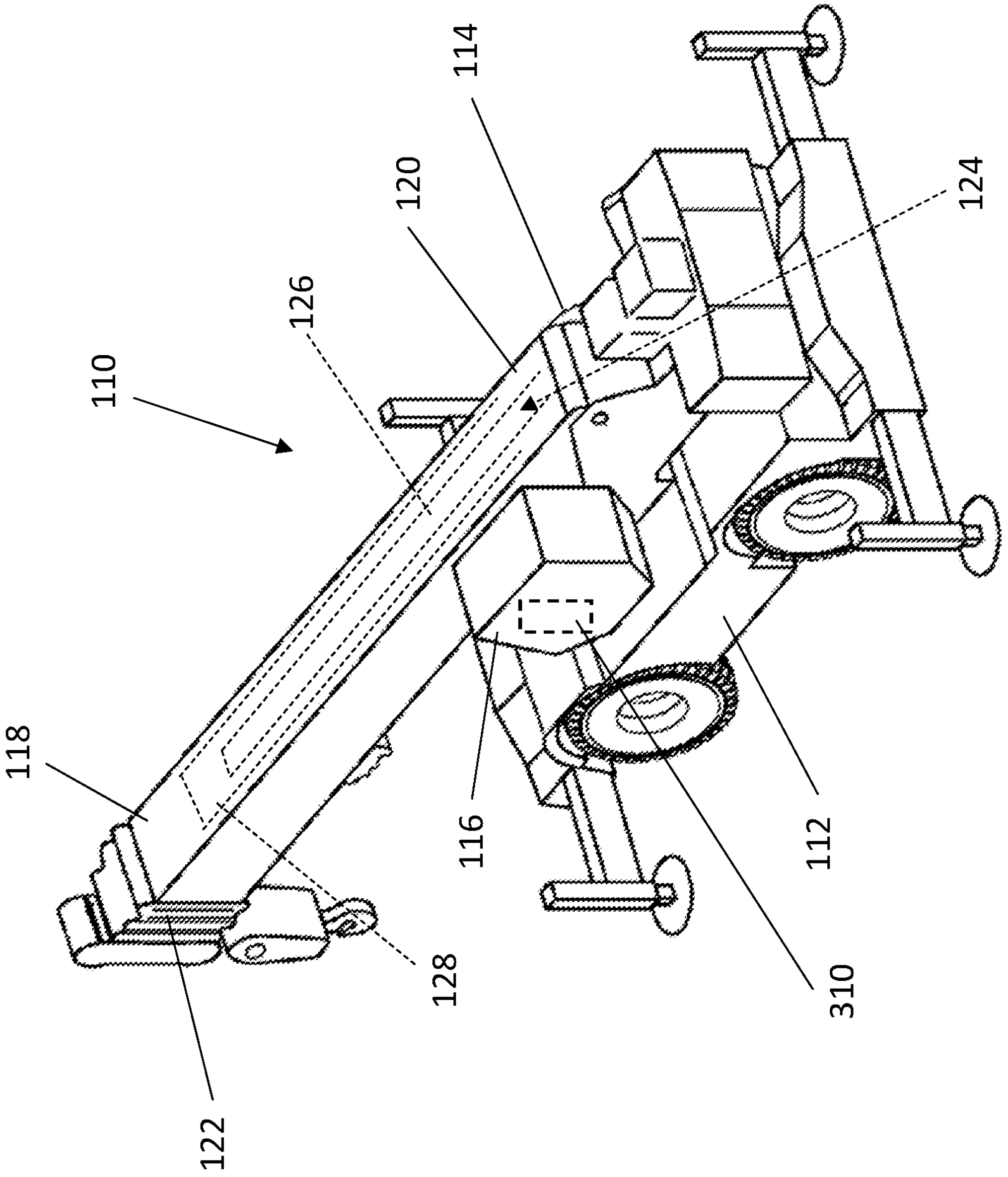
FIG. 1 is a perspective view of a crane according to an embodiment.
Figure 2:
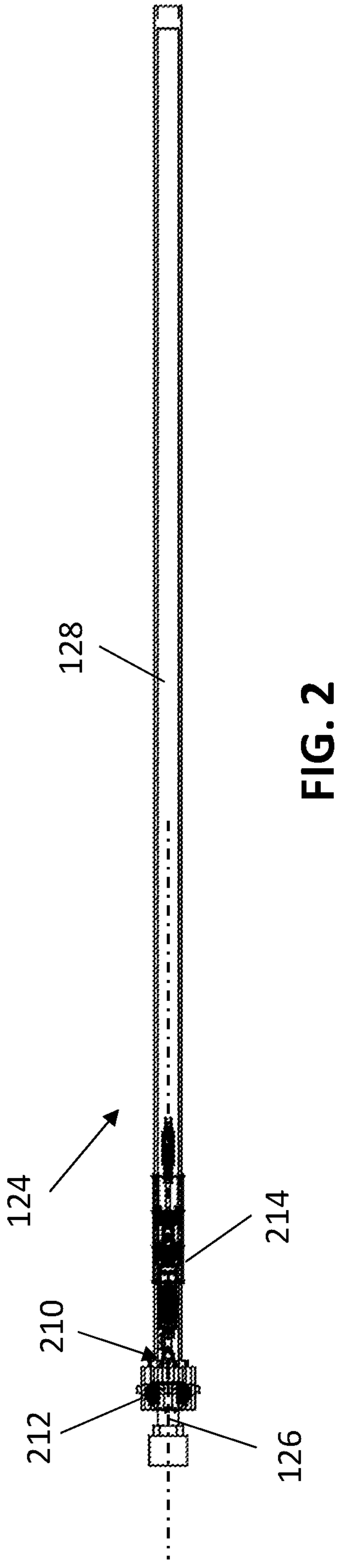
FIG. 2 is a top view of a boom actuator according to an embodiment.
Figure 3:
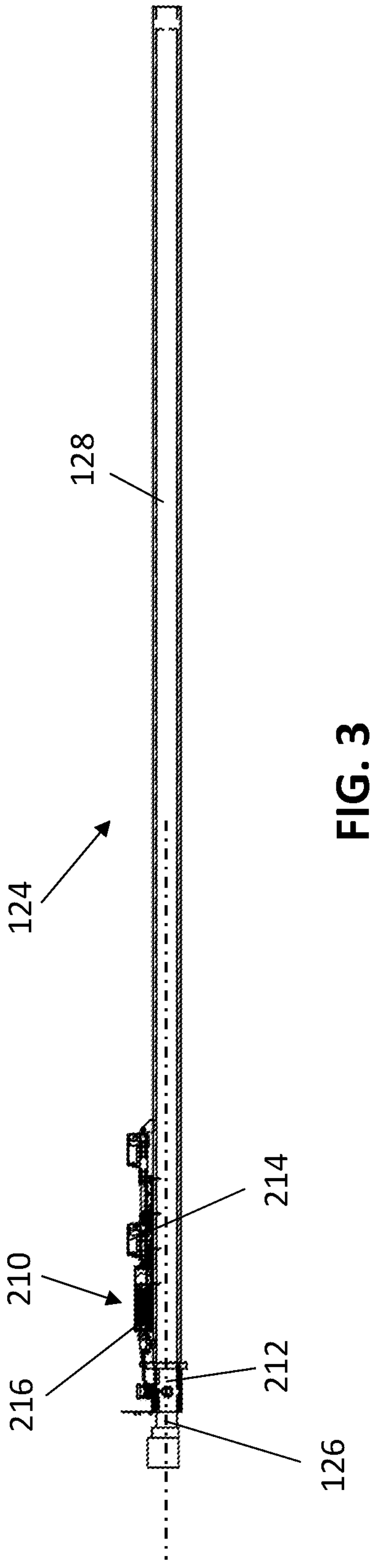
FIG. 3 is a side view of the boom actuator of FIG. 2.
Figure 4:
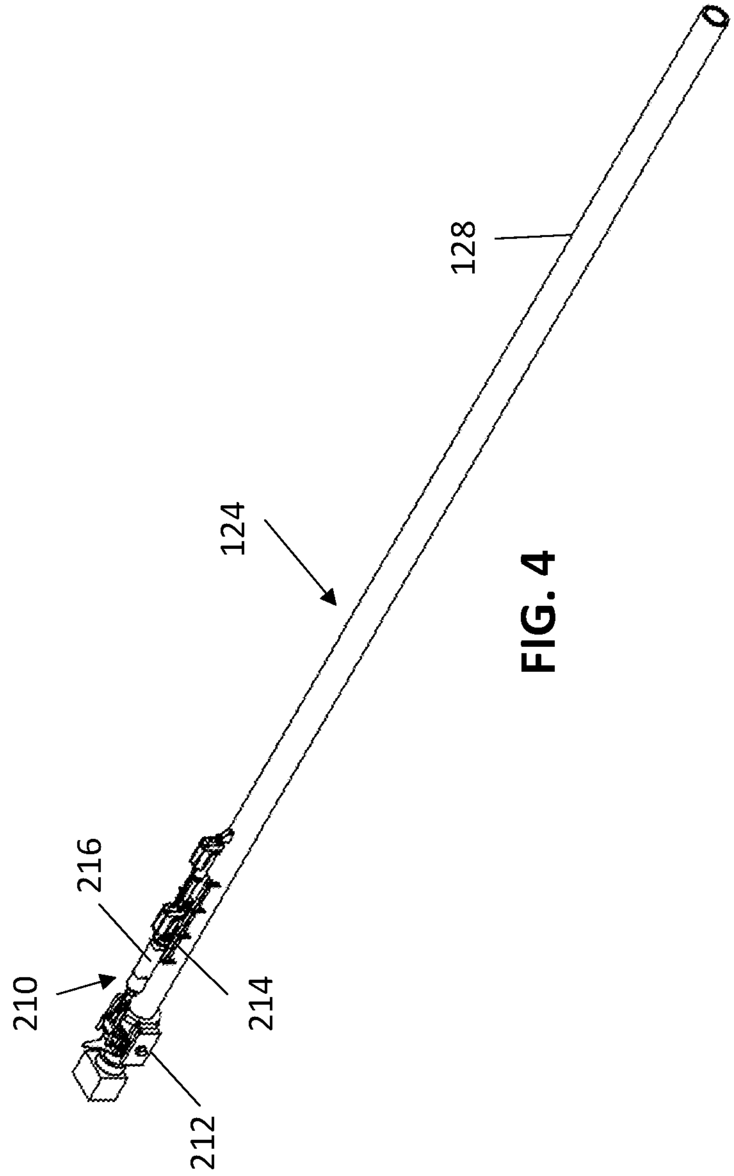
FIG. 4 is a perspective view of the boom actuator of FIG. 2.
Figure 5:
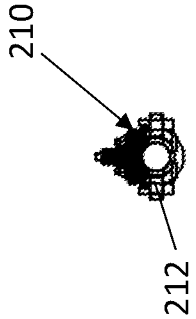
FIG. 5 is an end view of the boom actuator of FIG. 2.

Referring to FIG. 1, a crane 110 includes a carrier 112 and a superstructure 114 mounted on the carrier 112. In one embodiment, the superstructure 114 is rotatably mounted on the carrier 112. The superstructure 114 includes, for example, an operator's cab 116 and a telescoping boom 118. The telescoping boom 118 includes a base section 120 and one or more telescope sections 122 configured for movement into and out of the base section 120 to retract and extend the boom 118, respectively.

The telescoping boom 118 includes a boom actuator 124 disposed in the base section 120 for moving the one or more telescope sections 122. In one embodiment, the boom actuator 124 is a linear actuator, such as a hydraulic rod-cylinder assembly, in which a rod 126 is fixed within the base section

120 and the cylinder 128 moves relative to the rod 126 between a retracted position and an extended position.

Referring to FIGS. 2-5, the boom actuator 124 includes a locking head assembly 210 having a locking head 212, an actuator 214 and a motion mitigator 216. The locking head assembly 210 is configured to selectively couple and uncouple the boom actuator 124 to/from a telescope section 122. The locking head assembly 210 may also be configured to operate a section lock (not shown) disposed on a telescope section 122 to lock and unlock the telescope section to/from a next outwardly adjacent boom section 120, 122. The locking head assembly 210 may be connected to or mounted on the cylinder 128.

Figure 6A:
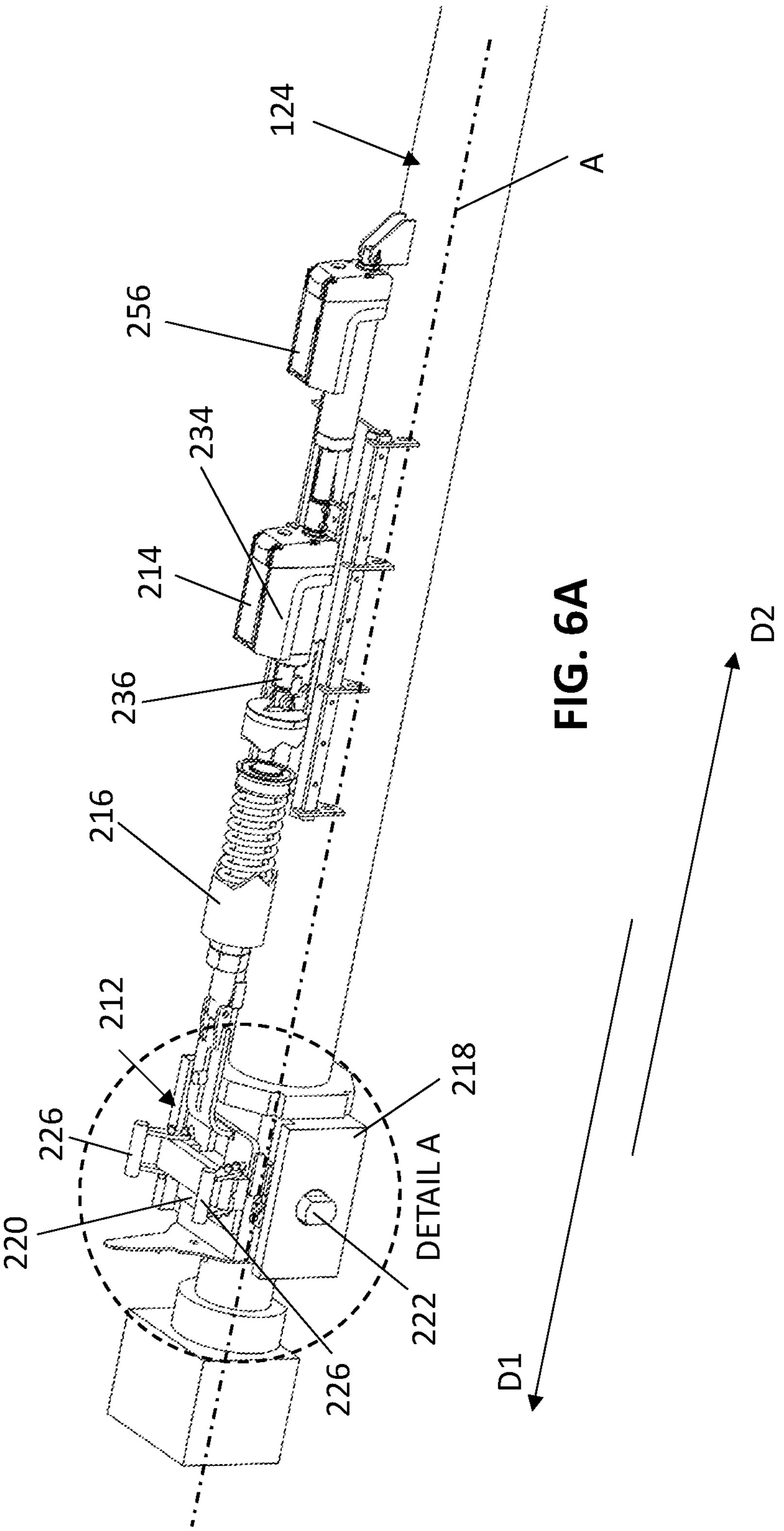
FIG. 6A is a perspective view of a locking head assembly according to an embodiment.
Figure 6B:
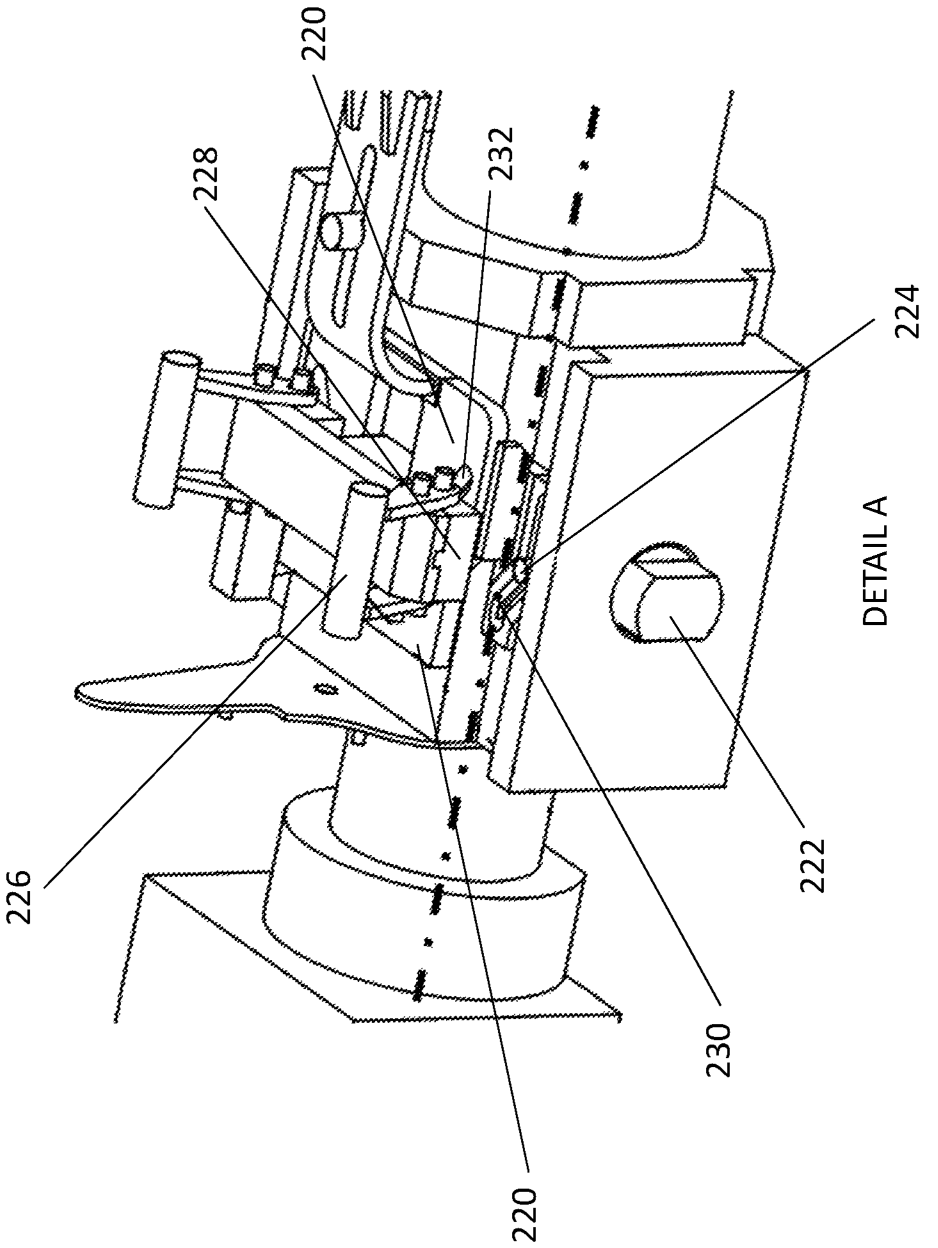
FIG. 6B is an enlarged view of DETAIL A in FIG. 6A.
Figure 7:
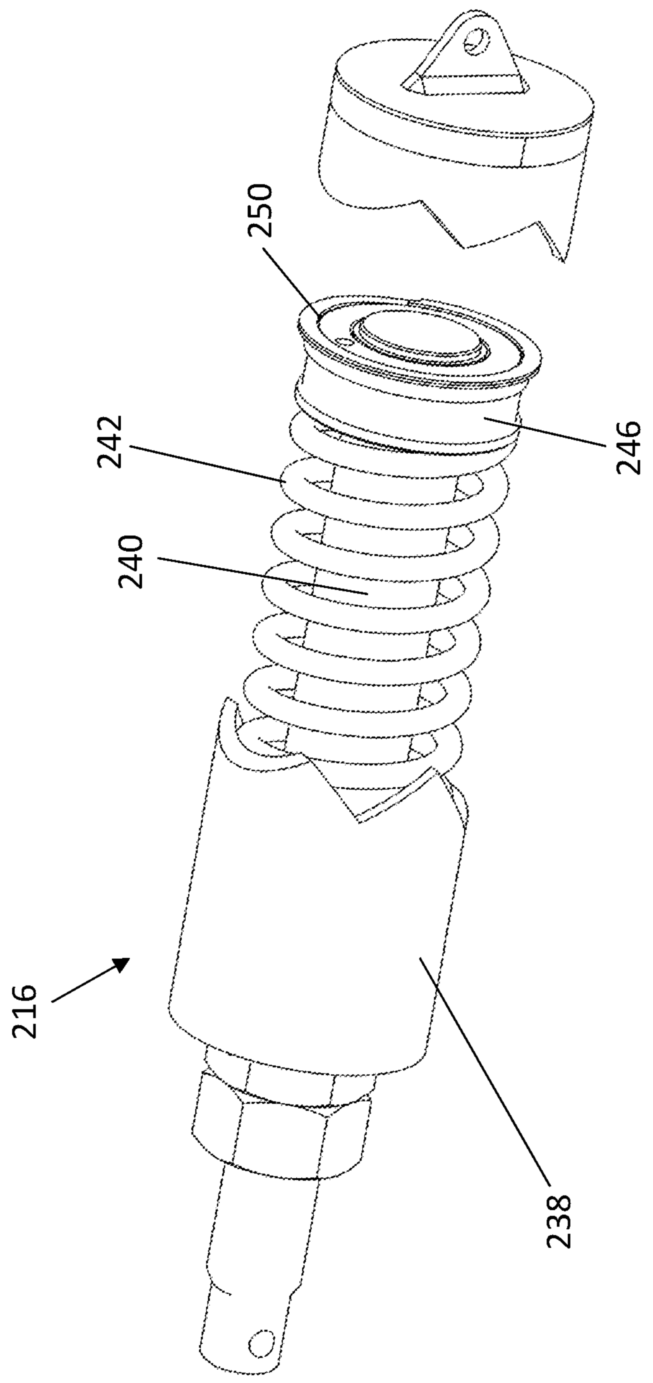
FIG. 7 is a perspective view of a motion mitigator in a rigid condition according to an embodiment.
Figure 8:
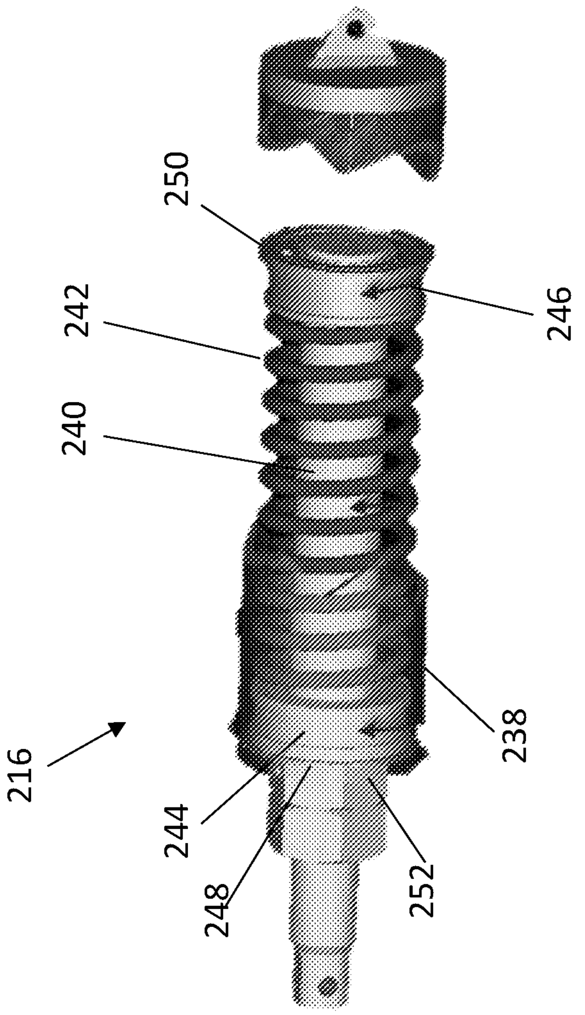
FIG. 8 is another perspective view of the motion mitigator of FIG. 7.
Figure 9:
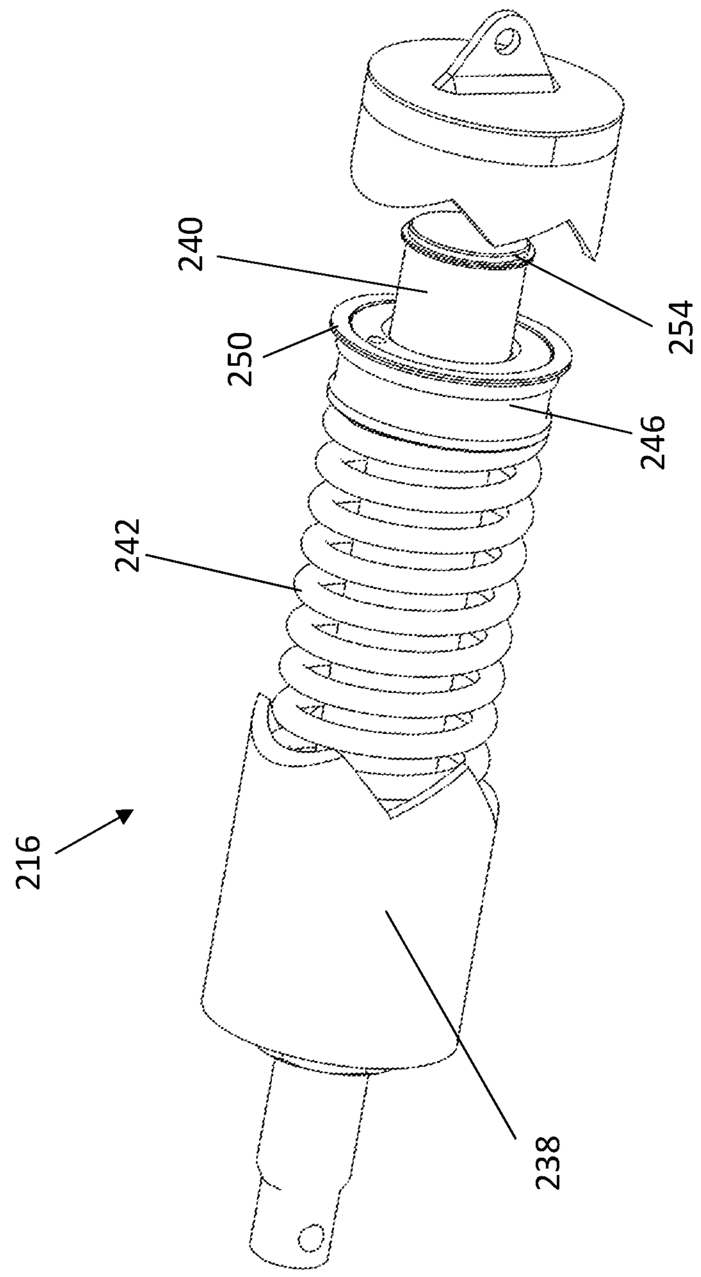
FIG. 9 is a perspective view of the motion mitigator of FIG. 7 in a first loaded condition according to an embodiment.
Figure 10:
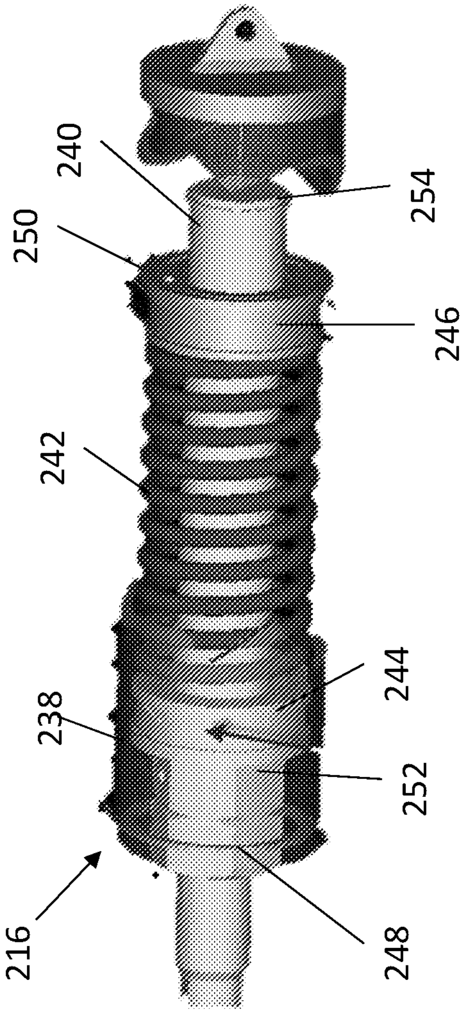
FIG. 10 is another perspective view of the motion mitigator of FIG. 9.
Figure 11:
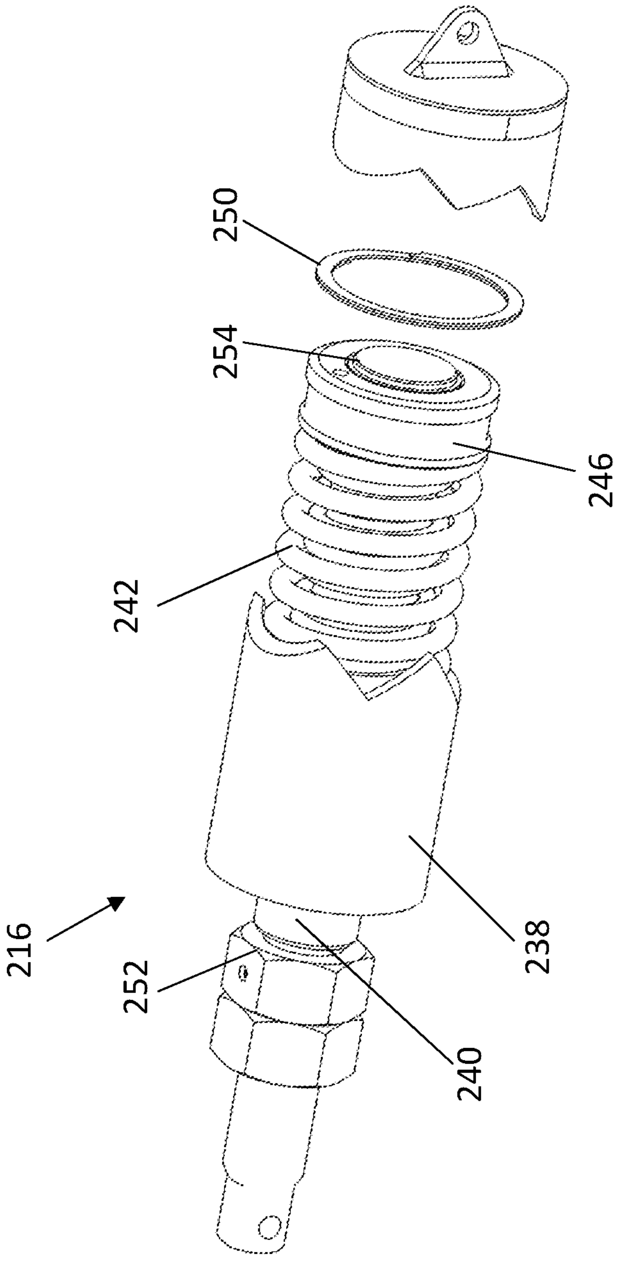
FIG. 11 is a perspective view of the motion mitigator of FIG. 7 in a second loaded condition according to an embodiment.
Figure 12:
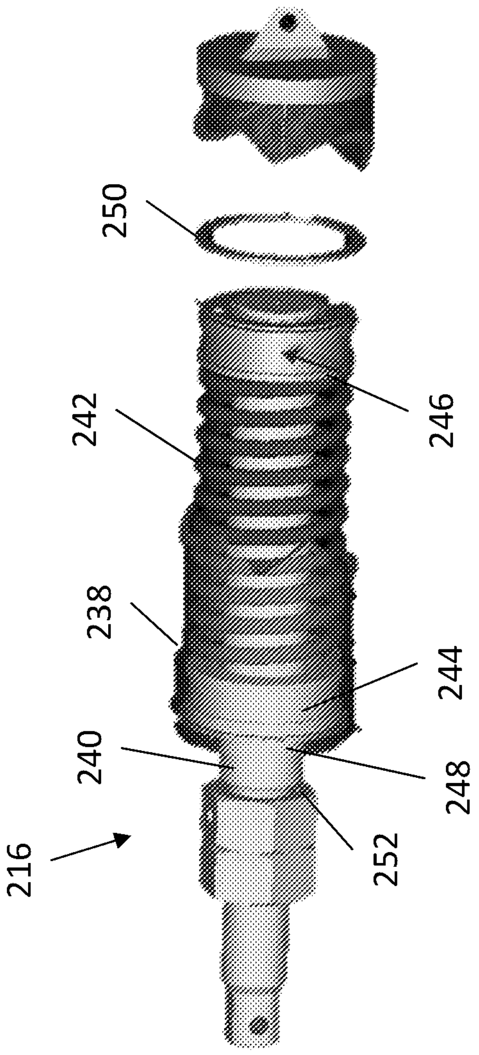
FIG. 12 is another perspective view of the motion mitigator of FIG. 11.

Referring to FIGS. 6A and 6B, and the diagrams of FIGS. 19A-19G, in one embodiment, the locking head 212 includes a base 218 and an operating plate 220 operably connected to the base 218. The operating plate 220 is movable relative to the base 218 generally along or parallel to a longitudinal axis A of the boom actuator 124 and/or the boom 118. The locking head 212 also includes one or more cylinder pins 222 operably connected to the operating plate 220 by a respective pin linkage 224. The pin linkage 224 may be a lug or similar structure connected to the cylinder pin 222 and extending to engage to the operating plate 220. In addition, the locking head 212 may include one or more section lock arms 226 operably connected to the operating plate 220 by a respective arm linkage 228. The arm linkage 228 may be a lug or similar structure connected to the section lock arm 226 and extending to engage to the operating plate 220.

The operating plate 220 includes one or more first guide walls 230. The first guide wall 230 includes a first section extending substantially in a direction of movement of the operating plate 220, i.e., in a direction parallel to the longitudinal axis A, and a second section angled relative to the first section and extending in a direction having a longitudinal component and a lateral component.

The first guide wall 230 is configured to engage the pin linkage 224. Movement of the operating plate 220 relative to the pin linkage 224 with the pin linkage 224 engaged at the first section of the first guide wall 230 does not cause the cylinder pin 222 to move. However, movement of the operating plate 220 relative to the pin linkage 224 with the pin linkage 224 engaged at the second section of the first guide wall 230 causes lateral movement of the cylinder pin 222 between an extended pin position (see FIG. 19A, for example) and a retracted pin position (see FIG. 19B, for example) relative to the base 218.

The operating plate 220 may also include one or more second guide walls 232. The second guide wall 232 includes a first section extending substantially in a direction of movement of the operating plate 220, i.e., in a direction parallel to the longitudinal axis A, and a second section angled relative to the first section and extending in a direction having a longitudinal component and a lateral component.

The second guide wall 232 is configured to engage the arm linkage 228. Movement of the operating plate 220 relative to the arm linkage 228 with the arm linkage 228 engaged at the first section of the second guide wall 232 does not cause the section lock arm 226 to move. However, movement of the operating plate 220 relative to the arm linkage 228 with the arm linkage 228 engaged at the second section of the second guide wall 232 causes the section lock arm 226 to move between a locking position (see FIG. 19A, for example) and an unlocking position (see FIG. 19C, for example). In one embodiment, the section lock arm 226 pivots or rotates between the locking and unlocking positions.

The first guide wall 230 and the second guide wall 232 may be positioned relative to one another such that the section lock arm 226 remains in the locking position when the cylinder pin 222 is driven to move between the extended and retracted positions. Similarly, the first guide wall 230 and the second guide wall 232 may be positioned such that the cylinder pin 222 remains in the extended position when the section lock arm 226 is moved between the locking and unlocking positions.

Figures 19A, 19B, 19C:
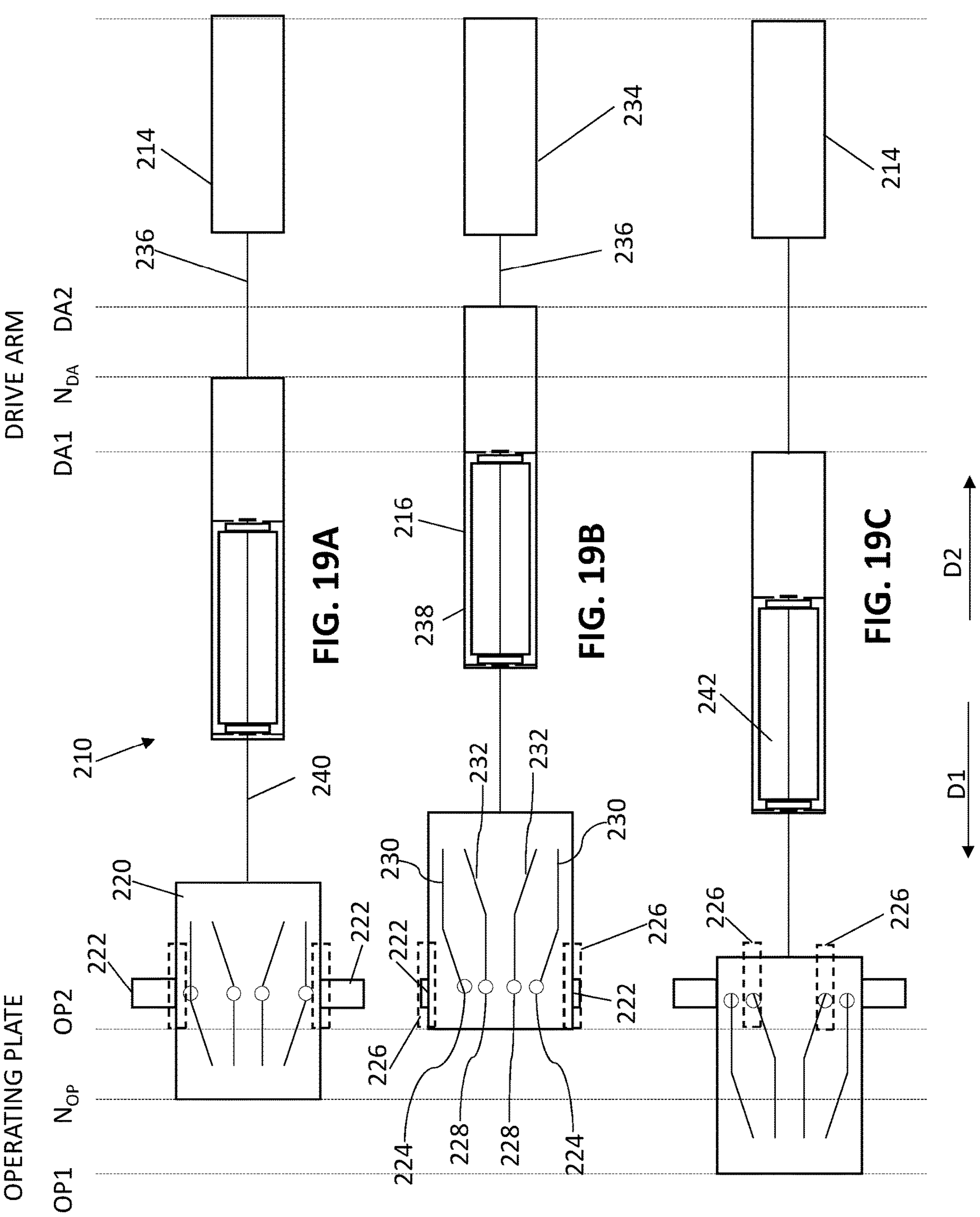
FIGS. 19A-G are diagrams showing conditions and positions of the locking head assembly according to embodiments.

In one embodiment, the pin linkage 224 and the arm linkage 228 may be simultaneously positioned at portions of respective first sections of the first and second guide walls 230, 232 (see FIG. 19A, for example). Accordingly, the cylinder pin 222 may be in the pin extended position while the section lock arm 226 is the locking position.

The first guide wall 230 and/or the second guide wall 232 may each be formed either by a slot or recess in the operating plate 220 or may project from a surface of the operating plate 220.

The operating plate 220 may be driven to move by the actuator 214 mounted to the boom actuator 124. The actuator 214 may include a motor 234 and a drive arm 236. In one embodiment, the actuator 214 is an electric actuator and the motor 234 is an electric motor. The drive arm 236 is driven by the motor 234 to extend and/or retract. In one embodiment, a spring or similar biasing device may urge the drive arm 236 to move in one direction.

In one embodiment, the drive arm 236 moves generally in the direction of the longitudinal axis A and is configured to drive corresponding movement of the operating plate 220. That is, movement of the drive arm 236 in a first direction D1 to extend relative to the motor 234 may cause movement of the operating plate 220 in the first direction D1. Similarly, movement of the drive arm 236 in a second direction D2 to retract relative to the motor 234 may cause movement of the operating plate in the second direction D2.

The motion mitigator 216 is operably connected to the actuator 214 and the locking head 212. In one embodiment, the motion mitigator 216 is disposed between the actuator 214 and the locking head 212 and may be connected at one end to the drive arm 236 and at another end to the operating plate 220. In other embodiments, the actuator 214 may be disposed between the motion mitigator 216 and the locking head 212.

Referring to FIGS. 7-12 and 19A-19G, in one embodiment, the motion mitigator 216 includes a housing 238, a rod 240 disposed at least partially within the housing 238 and at least one biasing device, such as a spring 242, disposed between the rod 240 and the housing 238. A first spring seat 244 may be disposed on the rod 240 at a first end of the spring 242. A second spring seat 246 may be disposed on the rod 240 at a second end of the spring 242. In one embodiment, the rod 240 extends through both the first spring seat 244 and the second spring seat 246. The rod 240 is movable relative to the first spring seat 244 and the second spring seat 246, and vice versa.

The housing 238 includes a first stop 248 configured to limit motion of the first spring seat 244 relative to the housing 238 in the first direction D1. The housing 238 also includes a second stop 250 configured to limit motion of the second spring seat 246 relative to the housing 238 in the second direction D2. The first stop 248 may also move the first spring seat 244 with the housing 238 relative to the rod 240 in the second direction D2. The second stop 250 may also move the second spring seat 246 with the housing 238 relative to rod 240 in the first direction D1.

The rod 240 may include a first rod stop 252 configured to limit movement of the first spring seat 244 relative to the rod 240 in the first direction D1. The rod 240 may also include a second rod stop 254 configured to limit movement of the second spring seat 246 relative to the rod 240 in the second direction D2.

In a first operating condition of the locking head assembly 210, the cylinder pin 222 and the section lock arm 226 can move freely in response to movement of the operating plate 220 relative to the base 218, and the motion mitigator 216 is in a rigid condition (see FIGS. 7, 8 and 19A-19C, for example). Accordingly, movement of the drive arm 236 causes a corresponding movement of the operating plate 220. In the rigid condition, the rod 240 and housing 238 remain substantially fixed relative to one another during movement of the drive arm 236. In one embodiment, the rod 240 is in a neutral position relative to the housing 238 with the motion mitigator 216 in the rigid condition, such that the motion mitigator 216 has a first length. In addition, in the rigid condition, a force generated by the drive arm 236 is transmitted through the motion mitigator 216 to the operating plate 220 and does not cause substantial deformation of the spring 242 or relative movement of the housing 238 and the rod 240.

In one embodiment, the drive arm 236 is in a drive arm neutral position (indicated at '$N_{DA}$', see FIG. 19A) and may be moved in the first direction D1 from the drive neutral position $N_{DA}$ to a drive arm first position (indicated at 'DA1', see FIG. 19C). In the first operating condition, such movement of the drive arm 236 causes corresponding movement of the operating plate 220 in the first direction D1 from a plate neutral position (indicated at '$N_{OP}$', see FIG. 19A) to a plate first position (indicated at 'OP1', see FIG. 19C). In one embodiment, the cylinder pin 222 is in the extended pin position and the section lock arm 226 is in the locking position when the operating plate 220 is in the plate neutral position $N_{OP}$. Movement of the operating plate 220 to the plate first position OP1 shown in FIG. 19C causes the section lock arm 226 to move to the unlocking position to unlock a section lock between the telescope section and an adjacent boom section, while the cylinder pin 222 remains in the extended position engaged with the telescope section.

Conversely, movement of the drive arm 236 in the second direction D2 from the drive arm first position DA1 (FIG. 19C) to the drive arm neutral position $N_{DA}$ (FIG. 19A) causes movement of the operating plate 220 in the second direction D2 from the plate first position OP1 (FIG. 19C) to the plate neutral position $N_{OP}$ (FIG. 19A). Movement of the operating plate 220 from the plate first position OP1 to the plate neutral position $N_{OP}$ causes the section lock arm 226 to move from the unlocking position (FIG. 19C) position to the locking position (FIG. 19A) to lock the section lock while the cylinder pin 222 remains in the extended position.

Still in the first operating condition, movement of the drive arm 236 in the second direction D2 from the drive arm neutral position $N_{DA}$ (FIG. 19A) to the drive arm second position DA2 (FIG. 19B) causes corresponding movement of the operating plate 220 in the second direction D2 from the plate neutral position $N_{OP}$ (FIG. 19A) to the plate second position OP2 (FIG. 19B). Movement of the operating plate 220 from the plate neutral position $N_{OP}$ to the plate second position OP2 causes the cylinder pin 222 to move from the extended pin position (FIG. 19A) to the retracted pin position (FIG. 19B) to disengage from the telescope section, while the section lock arm 226 remains in the locking position.

Conversely, movement of the drive arm 236 in the first direction D1 from the drive arm second position DA2 (FIG. 19B) to the drive arm neutral position $N_{DA}$ (FIG. 19A) causes corresponding movement of the operating plate 220 in the first direction D1 from the plate second position OP2 (FIG. 19B) to the plate neutral position $N_{OP}$ (FIG. 19A). Movement of the operating plate 220 from the plate second position OP2 to the plate neutral position $N_{OP}$ causes the cylinder pin 222 to move from the retracted pin position (FIG. 19B) to the extended pin position (FIG. 19A) while the section lock arm 226 remains in the locking position.

In other operating conditions of the locking head assembly 210, movement of the operating plate 220 may be inhibited when movement of a cylinder pin 222 or section lock arm 226 is inhibited. For example, if movement of a cylinder pin 222 from the extended pin position to the retracted pin position is inhibited, movement of the operating plate 220 from the plate neutral position $N_{OP}$ (FIG. 19A) to the plate second position OP2 (FIG. 19B) is also inhibited when the drive arm 236 is operated. In another example, movement of a cylinder pin 222 from a retracted pin position to an extended pin position may be inhibited, which then inhibits movement of the operating plate 220 from the plate second position OP2 (FIG. 19B) to the plate neutral position $N_{OP}$ (FIG. 19A) when the drive arm 236 is operated.

In other examples, movement of the section lock arm 226 from a locking position to an unlocking position may be inhibited, which inhibits movement of the operating plate 220 from the plate neutral position $N_{OP}$ to the plate first position OP1 when the drive arm 236 is operated. In still another example, movement of the section lock arm 226 may be inhibited from the unlocking position to the locking position, which inhibits movement of the operating plate 220 from the plate first position OP1 to the plate neutral position $N_{OP}$ when the drive arm 236 is operated.

The motion mitigator 216 is configured to move from a rigid condition to one or more loaded conditions when the drive arm 236 is operated to move while movement of the operating plate 220 is inhibited. That is, when movement of the operating plate 220 is inhibited, a force applied from drive arm 236 overcomes a spring force of the spring 242 such that a relative positioning of the housing 238 and rod 240 is changed. For example, the motion mitigator 216 is moved to a first loaded condition (FIGS. 9, 10, 19F and 19G) when the rod 240 is in a retracted position relative to the housing 238 and the spring 242 is compressed to apply a biasing force to urge the operating plate 220 in the first direction D1. The motion mitigator 216 has a second length in the first loaded condition, less than the first length. Accordingly, in the first loaded condition, the motion mitigator 216 can urge the operating plate 220 to move in the first direction D1 from the plate neutral position $N_{OP}$ to the plate first position OP1, or from the plate second position OP2 to the plate neutral position $N_{OP}$.

The motion mitigator 216 is configured to move from the rigid condition to a second loaded condition (FIGS. 11, 12, 19D and 19E) when the rod 240 is in an extended position relative to the housing 238 and the spring 242 is compressed to apply a biasing force urging the operating plate 220 in the second direction D2. The motion mitigator 216 has a third length in the second loaded condition, greater than the first length. Accordingly, in the second loaded condition, the motion mitigator 216 can urge the operating plate 220 to move in the second direction D2 from the plate first position OP1 to the plate neutral position $N_{OP}$ or from the plate neutral position $N_{OP}$ to the plate second position OP2.

In the embodiments above, the motion mitigator 216 may be moved from the rigid condition to the first loaded condition when movement of the cylinder pin 222 from the retracted pin position to the extended pin position is inhibited (FIG. 19G) or when movement of the section lock arm from the locking position to the unlocking position is inhibited (FIG. 19F) in response to corresponding movements of the drive arm 236. That is, the motion mitigator 216 may be moved to the first loaded condition when the operating plate 220 is held against movement in response to movement of the drive arm 236 in the first direction D1.

Figures 19D, 19E:
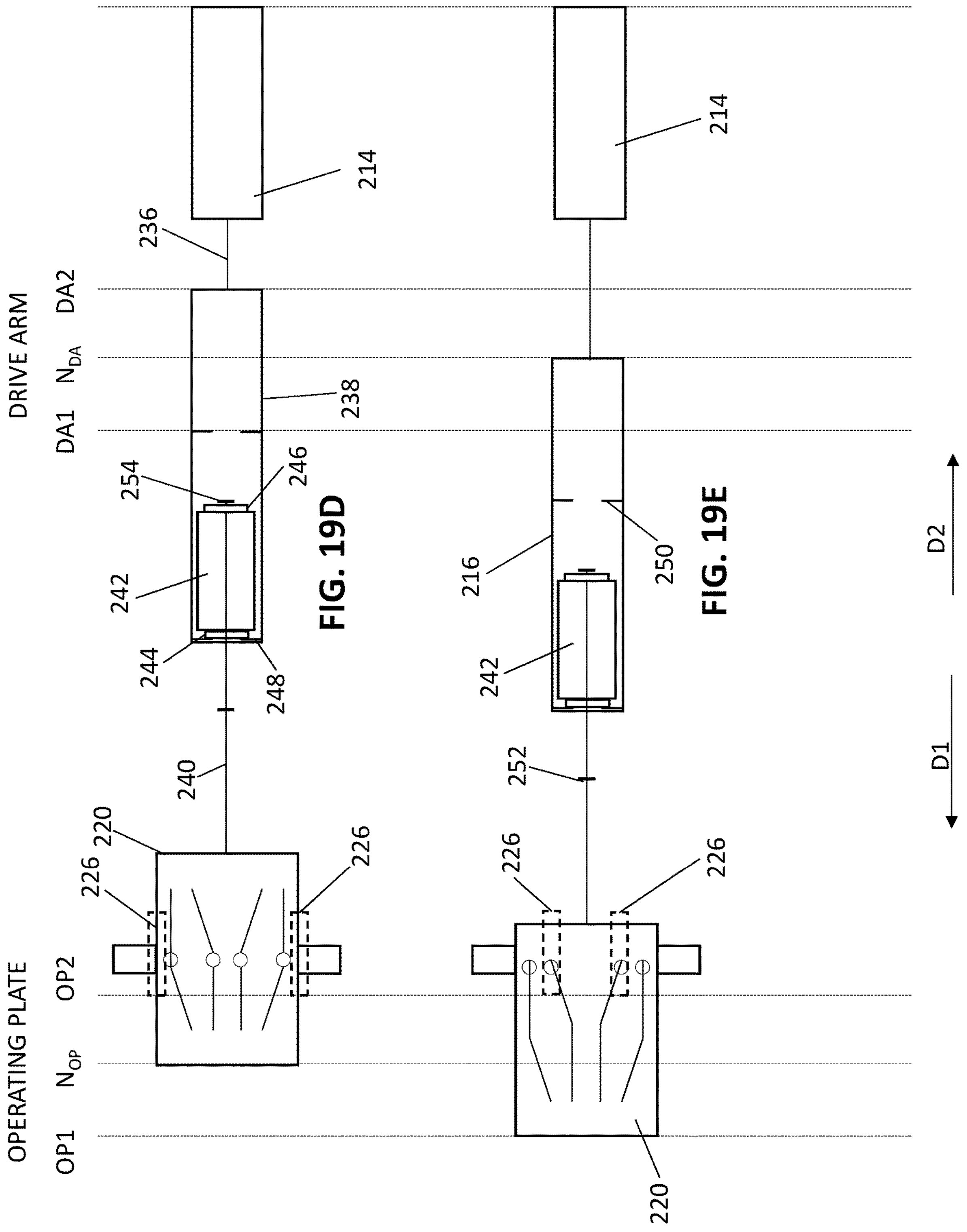
Figures 19F, 19G:
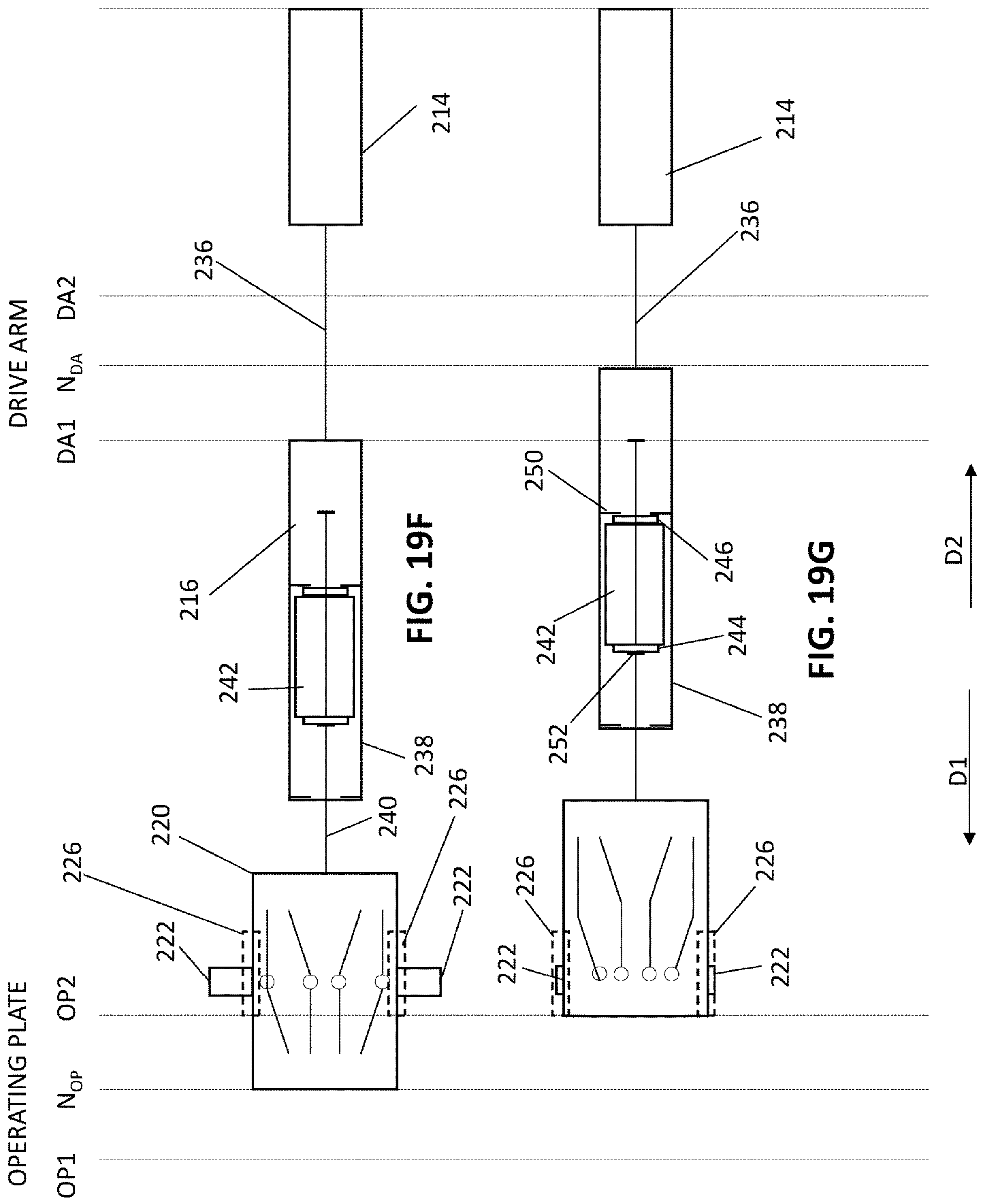

For example, the drive arm 236 may be operated to move in the first direction D1 from the drive arm neutral position $N_{DA}$ to the drive arm first position DA1, shown in FIG. 19F. However, with movement of the section lock arm 226 to the unlocking position inhibited, the operating plate 220 remains in the plate neutral position $N_{OP}$, also shown in FIG. 19F. Similarly, the drive arm 236 may be operated to move in the first direction D1 from the drive arm second position DA2 to the drive arm neutral position $N_{DA}$ as shown in FIG. 19G. However, with movement of the cylinder pin 222 to the extended pin position inhibited, the operating plate 220 remains in the plate second position OP2, also shown in FIG. 19G.

Accordingly, in one embodiment, the rod 240 is held against movement in the first direction D1 by the operating plate 220 and the drive arm 236 causes the housing 238 to move in the first direction D1 relative to the rod 240. The second stop 250 of the housing 238 drives the second spring seat 246 along the rod 240 while the first rod stop 252 holds the first spring seat 244 against movement in the first direction D1, and the spring 242 is compressed.

The compressed spring 242 applies a biasing force to the operating plate 220 in the first direction D1. Accordingly, when the cylinder pin 222 becomes free to extend, the spring force from the motion mitigator 216, in the first loaded condition, causes the operating plate 220 to move from the plate second position OP2 to the plate neutral position $N_{OP}$ to extend the cylinder pin 222 without further operation of the actuator 214 (or further movement of the drive arm 236).

Similarly, when the section lock arm 226 becomes free to move to the unlocking position, the spring force from the motion mitigator 216, in the first loaded condition, causes the operating plate 220 to move from the plate neutral position $N_{OP}$ to the plate first position OP1 to move the section lock arm 226 to the unlocking position without further operation of the actuator 214 (or further movement of the drive arm 236).

The motion mitigator 216 causes movement of the operating plate 220 in the first direction D1 by application of the spring force of the compressed spring 242 to the first spring seat 244 in the first direction D1, and in turn, to the first rod stop 252. The spring force causes the rod 240 to move to its the neutral position relative to the housing 238 and drive the operating plate 220 in the first direction D1. Accordingly, the motion mitigator 216 may be returned to its rigid condition.

For example, when the cylinder pin 222 becomes free to extend, the motion mitigator 216 can move from its first loaded condition shown in FIG. 19G to its rigid condition shown in FIG. 19A, and the operating plate 220 can move from the plate second position OP2 shown in FIG. 19G to the plate neutral position $N_{OP}$ shown in FIG. 19A. In another example, when the section lock arm 226 becomes free to move to the unlocking position, the motion mitigator 216 can move from its first loaded condition shown in FIG. 19F to its rigid condition shown in FIG. 19C, and the operating plate 220 can move from the plate neutral position $N_{OP}$ shown in FIG. 19F to the plate first position OP1 shown in FIG. 19C.

In the embodiments above, the motion mitigator 216 may be moved from the rigid condition to the second loaded condition when the movement of the cylinder pin 222 from the extended pin position to the retracted pin position is inhibited (FIG. 19D) or when movement of the section lock arm 226 from the unlocking position to the locking position is inhibited (FIG. 19E).

For example, the drive arm 236 may be operated to move in the second direction D2 from the drive arm first position DA1 to the drive arm neutral position $N_{DA}$ as shown in FIG. 19E. However, with movement of the section lock arm 226 to the locking position inhibited, the operating plate 220 remains in the plate first position OP1. Similarly, the drive arm 236 may be operated to move in the second direction D2 from the drive arm neutral position $N_{DA}$ to the drive arm second position DA2 as shown in FIG. 19D. However, with movement of the cylinder pin 222 to the retracted position inhibited, the operating plate 220 remains in the plate neutral position $N_{OP}$.

Accordingly, the rod 240 is held against movement in the second direction D2 by the operating plate 220 and the drive arm 236 causes the housing 238 to move in the second direction D2 relative to the rod 240. The first stop 248 of the housing 238 drives the first spring seat 244 along the rod 240 in the second direction D2 while the second rod stop 254 holds the second spring seat 246 against movement in the second direction D2, and the spring 242 is compressed.

The compressed spring 242 applies a biasing force to the operating plate 220 in the second direction D2. Accordingly, when the cylinder pin 222 becomes free to retract, the spring force from the motion mitigator 216, in the second loaded condition, causes the operating plate 220 to move from the plate neutral position $N_{OP}$ to the plate second position OP2 to retract the cylinder pin 222 without further operation of the actuator 214 (or further movement of the drive arm 236).

Similarly, when the section lock arm 226 becomes free to move to the locking position, the spring force from the motion mitigator 216, in the second loaded condition, causes the operating plate 220 to move from the plate first position OP1 to the plate neutral position $N_{OP}$ to move the section lock arm 226 to the locking position without further operation of the actuator (or further movement of the drive arm 236).

The motion mitigator 216 causes movement of the operating plate 220 in the second direction D2 by application of the spring force of the compressed spring 242 to the second spring seat 246 in the second direction D2, and in turn, to the second rod stop 254. The spring force causes the rod 240 to retract to its neutral position relative to the housing 238 and drive the operating plate 220 in the second direction D2. Accordingly, the motion mitigator 216 may be returned to its rigid condition.

For example, when the cylinder pin 222 becomes free to retract, the motion mitigator 216 can move from its second loaded condition shown in FIG. 19D to its rigid condition shown in FIG. 19B, and the operating plate 220 can move from the plate neutral position $N_{OP}$ shown in FIG. 19D to the plate second position OP2 shown in FIG. 19B. In another example, when the section lock arm 226 becomes free to move to the locking position, the motion mitigator 216 can move from its second loaded condition shown in FIG. 19E to its rigid condition shown in FIG. 19A, and the operating plate 220 can move from the plate first position OP1 shown in FIG. 19E to the plate neutral position $N_{OP}$ shown in FIG. 19A.

Figure 13:
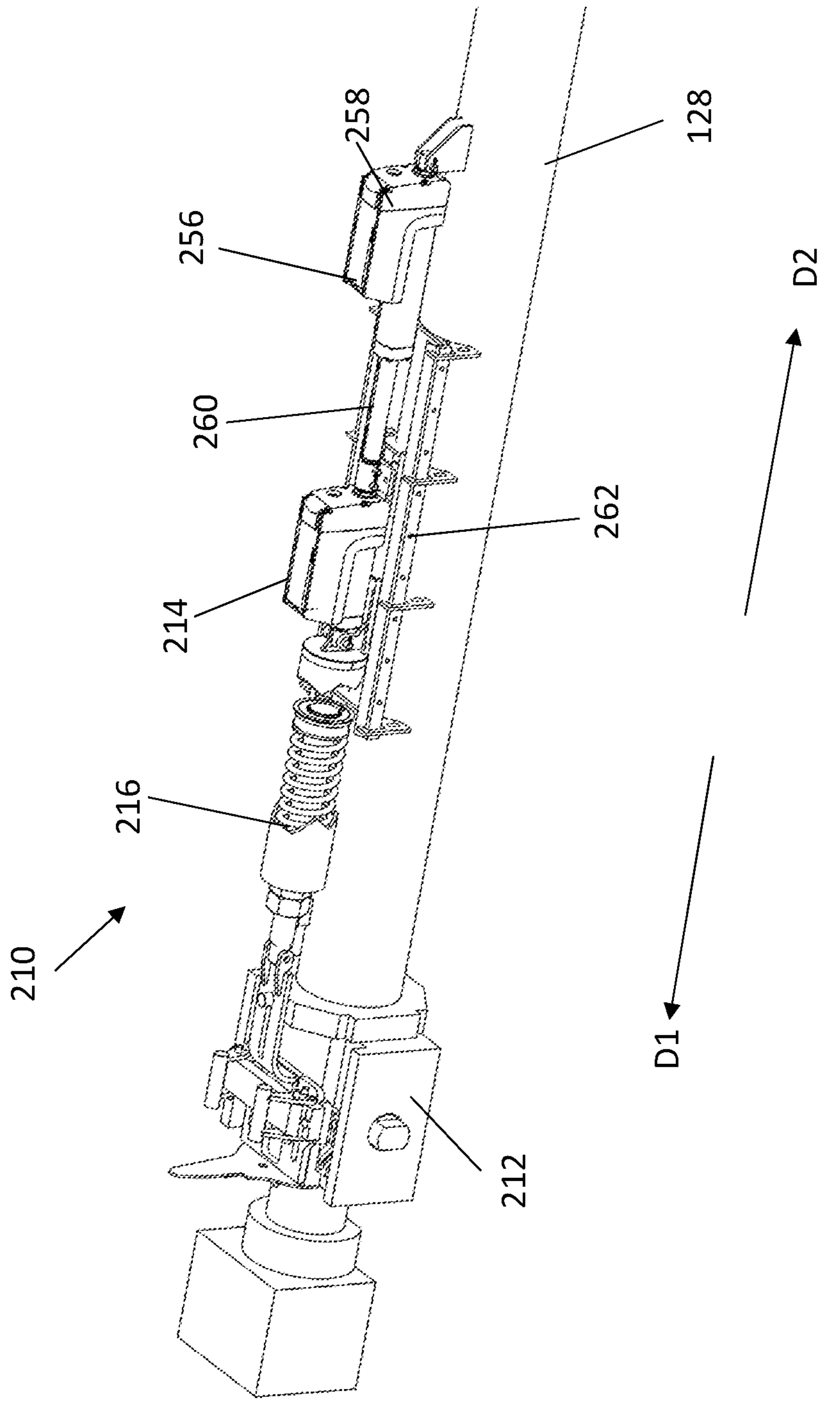
FIG. 13 is a perspective view of a locking head assembly according to an embodiment.

Referring to FIGS. 6A and 13, in one embodiment, the locking head assembly 210 may further include an auxiliary drive device, such as auxiliary actuator 256 (FIG. 6A), connected to the actuator 214. The auxiliary actuator 256 may be an actuator similar to the actuator 214 and include an auxiliary motor 258 and an auxiliary drive arm 260 driven by the auxiliary motor 258. In one embodiment, the auxiliary actuator 256 is an electric actuator and the auxiliary motor 258 is an electric motor. The auxiliary drive arm 260 is configured for movement in the first direction D1 and the second direction D2. The auxiliary drive arm 260 is configured for movement over a distance that is approximately twice as long as a distance through which the drive arm 236 moves, i.e., twice as long as the distance between the drive arm first position DA1 and the drive arm second position DA2.

Figure 14:
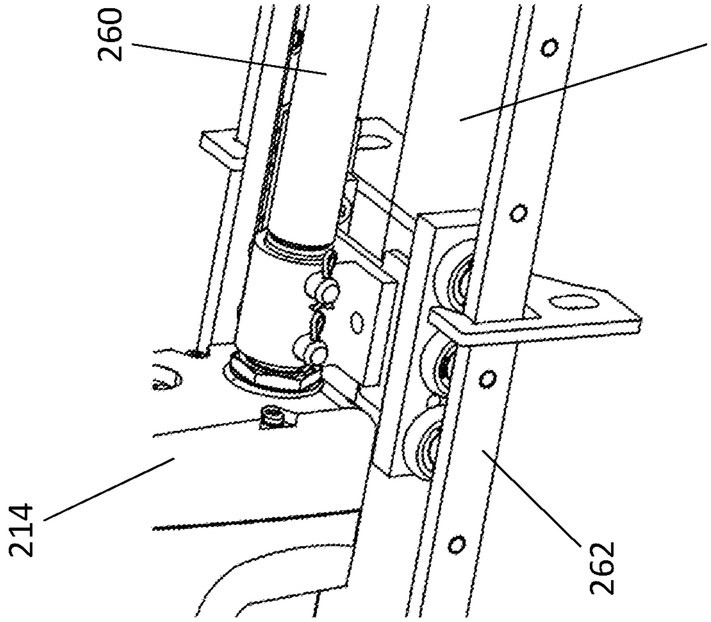
FIG. 14 is an enlarged view showing a portion of the locking head assembly of FIG. 13.
Figure 18:
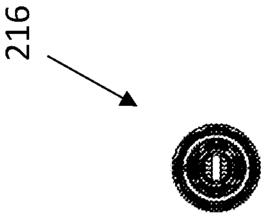
FIGS. 15-18 show various views of the motion mitigator according to embodiments.
Figure 15:
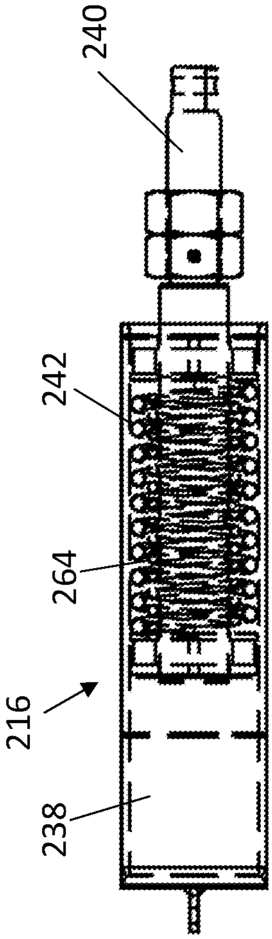
Figure 16:
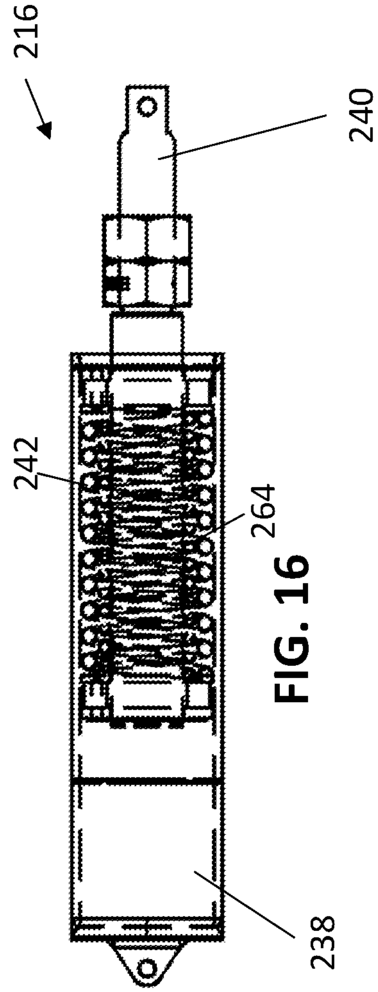
Figure 17:
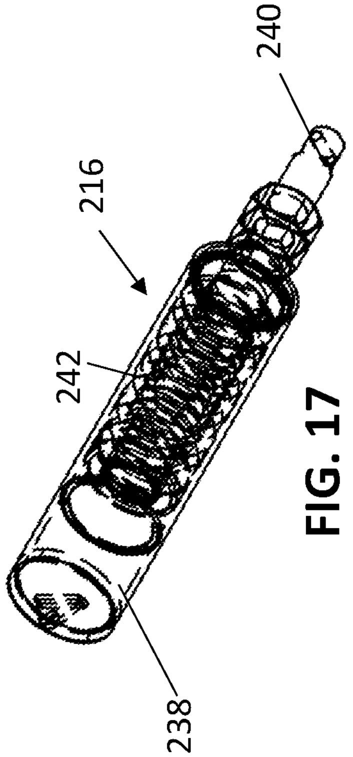

With reference to FIGS. 13 and 14, in one embodiment, the auxiliary actuator 256 may operate instead of the actuator 214, for example, in the event operations of the actuator 214 are ceased. To this end, the actuator 214 may be mounted on the cylinder 128 for translational movement. For instance, the actuator 214 may be mounted on a track 262 to slide or roll relative to the cylinder 128. The auxiliary drive arm 260 may be connected to the actuator 214 and configured to move the actuator 214 on the track 262 in response to operation of the auxiliary actuator 256.

For example, it may be determined that the actuator 214 with the drive arm 236 is in the neutral position. The desired cylinder pin 222 and section lock arm 226 movements may then be performed by using the auxiliary actuator 256 to drive movement of the operating plate 220.

In another example, operations of the actuator 214 may be ceased with the drive arm 236 in the drive arm first position DA1 or the drive arm second position DA2 and the operating plate 220 in a corresponding plate first position OP1 or plate second position OP2. The auxiliary actuator 256 may be operated, with the auxiliary drive arm 260 initially in neutral position, to move the operating plate 220 between the plate first position OP1 and the plate neutral position $N_{OP}$ and/or between the plate neutral position $N_{OP}$ and the plate second position OP2. However, an extension distance of the auxiliary drive arm 260 from its neutral position to its first position is twice as long as an extension distance of the drive arm 236 from the drive neutral position to the drive arm first position DA1, to account for the scenario in which the drive arm 236 and operating plate 220 may be in their retracted, second positions, when operation of the auxiliary actuator 256 begins.

With reference to FIGS. 15-18, in one embodiment, the motion mitigator 216 may further include a second biasing device, such as a second spring 264, configured to provide a spring force in a direction opposite to the spring force of the spring 242, or alternatively, in the same direction as the spring force of the spring 242. The second spring 264 may be disposed within the spring 242. In this manner, a desired force profile may be provided. In addition, the force profile may be tuned as desired by adjusting or replacing the spring 242 or the second spring 264. For example, a net spring force of the motion mitigator 216 may be tuned to be greater than or less than the spring force of the spring 242.

Figure 20:
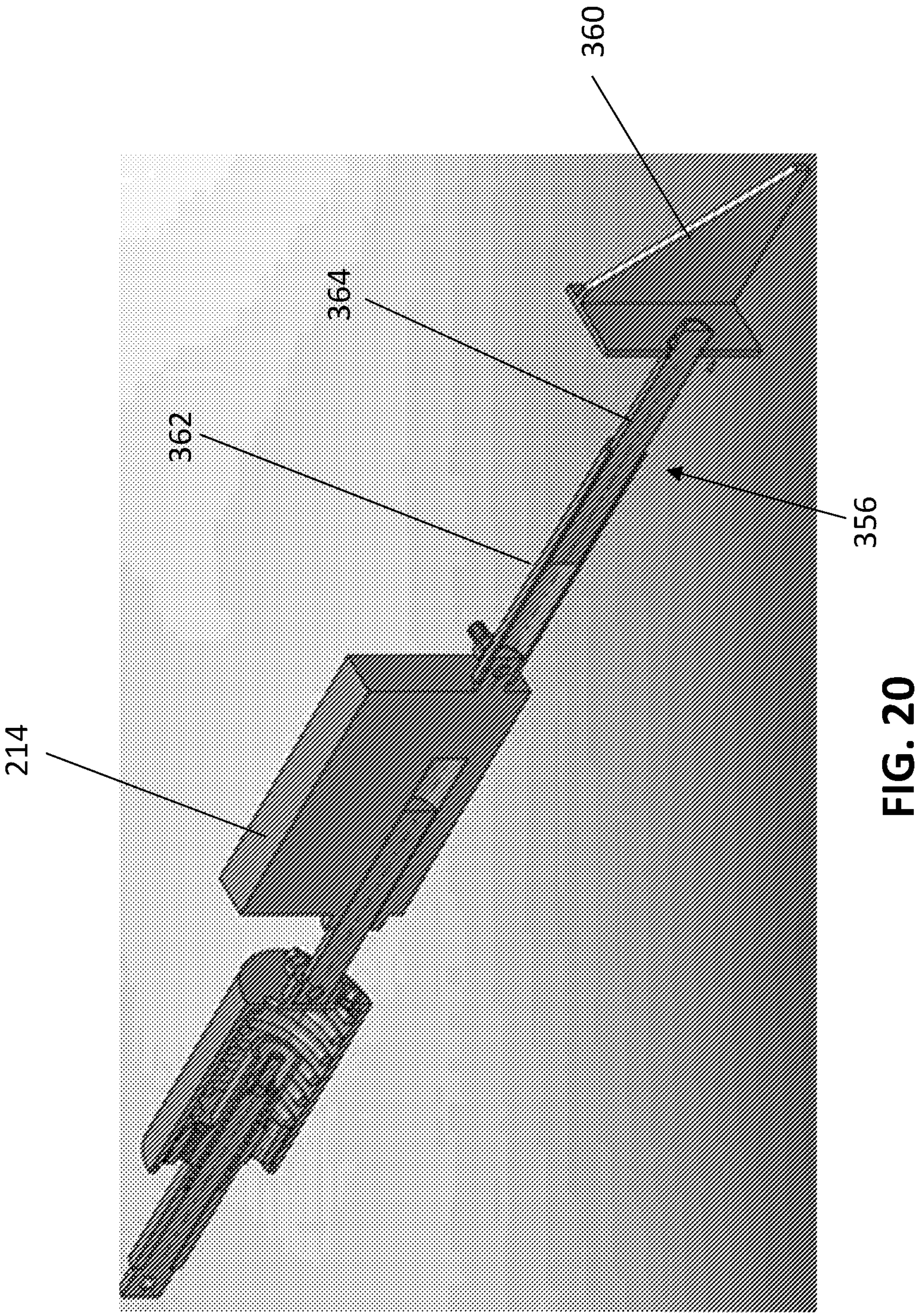
FIG. 20 is a perspective view of an auxiliary drive device according to an embodiment.

Referring to FIG. 20, in another embodiment the auxiliary drive device may be a threaded drive 356. In one embodiment, the threaded drive 356 may be turnbuckle or similar device. In one embodiment, the actuator 214 may be connected to the cylinder 128 by the threaded drive 356. In one embodiment, the threaded drive 356 may have an internally threaded component or tube 362 and an externally threaded component or rod 364 configured for mating, threaded engagement with the tube 362. The threaded drive 356 may be operably connected to a cylinder bracket 360 connected to a cylinder 128 of a boom actuator. In one embodiment, the rod 364 may be coupled to the cylinder bracket 360 via a thrust washer and held in place with snap rings. In one embodiment, the rod 364 is configured for rotation relative to the cylinder bracket 360 and the tube 362. The rod 364 may be substantially held against linear movement relative to the cylinder bracket 360. Thus, rotation of rod 364 may cause linear movement of the tube 362 and the actuator 214 by way of the threaded engagement between the tube 362 and the rod 364. In one embodiment, the rod 364 may be rotated by a tool engaged, for example, with an end of the rod 364 adjacent to the cylinder bracket 360. Accordingly, the threaded drive 356 may be mechanically or manually driven to move the actuator 214 relative to the cylinder 128 to drive movement of the operating plate 220.

Figure 21:
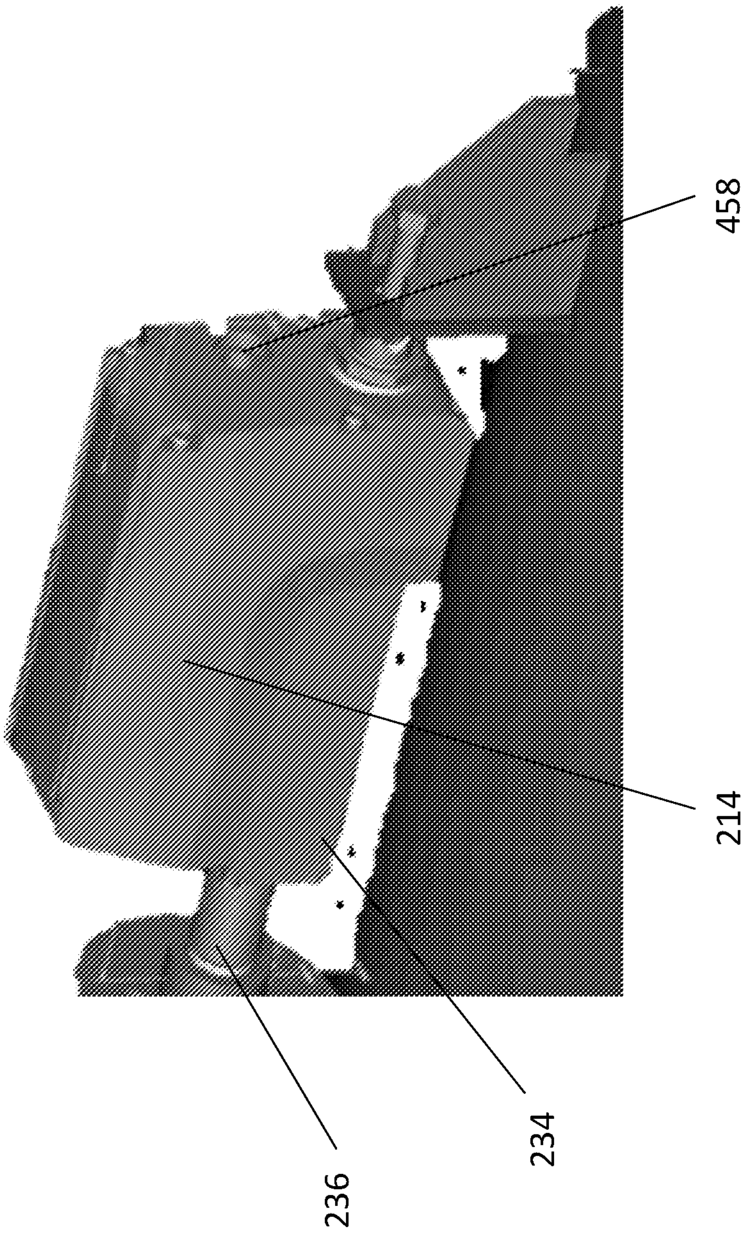
FIG. 21 is a perspective view of an actuator configured for use with an auxiliary drive device according to an embodiment.
Figure 22:
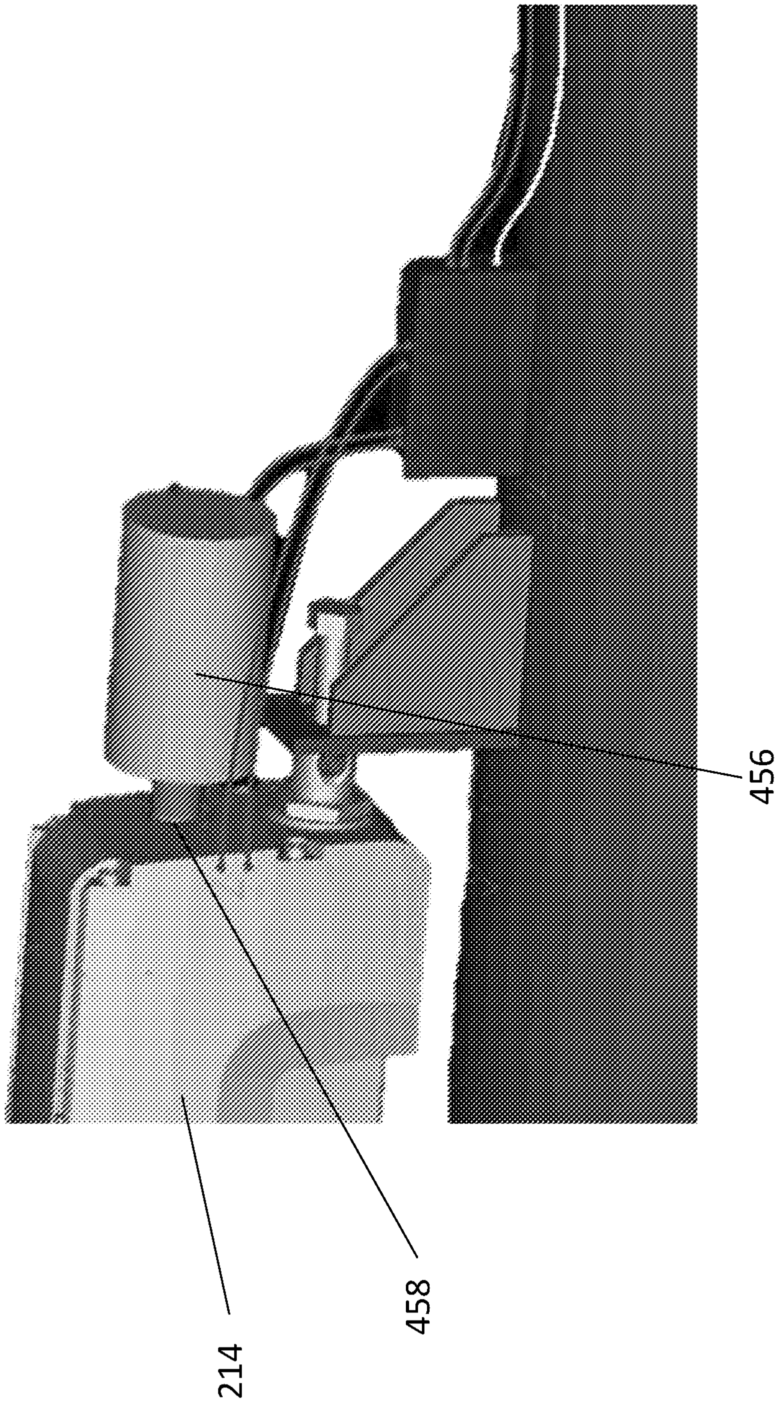
FIG. 22 is a perspective view of an auxiliary drive device together with the actuator of FIG. 21, according to an embodiment.

Referring to FIGS. 21-22, in another embodiment, the auxiliary drive device may be connected to the actuator 214 at an auxiliary drive interface 458 on the actuator 214. For example, in one embodiment, the auxiliary drive device may be a tool (not shown) connected to the auxiliary drive interface 458 which can be operated to drive the gearing of the motor 234 to drive movement of the drive arm 236. As shown in FIG. 22, in one embodiment, the auxiliary drive device may be a secondary motor 456 that may be connected to the auxiliary drive interface 458. The secondary motor 456 may then be operated to drive movement of the drive arm 236 via the gearing of the motor 234. The secondary motor 456 can be operably connected to a control system 310 (FIG. 1) and controlled via the control system 310.

Referring again to FIG. 1, the crane 110 may also include the control system 310. The control system 310 may be operably connected to the boom actuator 124 and configured to control movements of the boom actuator 124. For example, the control system 310 may control the boom actuator 124 to extend and retract. In an embodiment, the control system 310 may be operably connected to the locking head assembly 210 as well, for example, to control operations of the actuator 214. For example, the control system 310 may operate the actuator 214 to extend and/or retract the drive arm 236 to cause movement of the operating plate 220. Accordingly, the control system 310 may control movement of the cylinder pins 222 and the section lock arms 226 by controlling movement of the operating plate 220 with the actuator 214.

Figure 23:
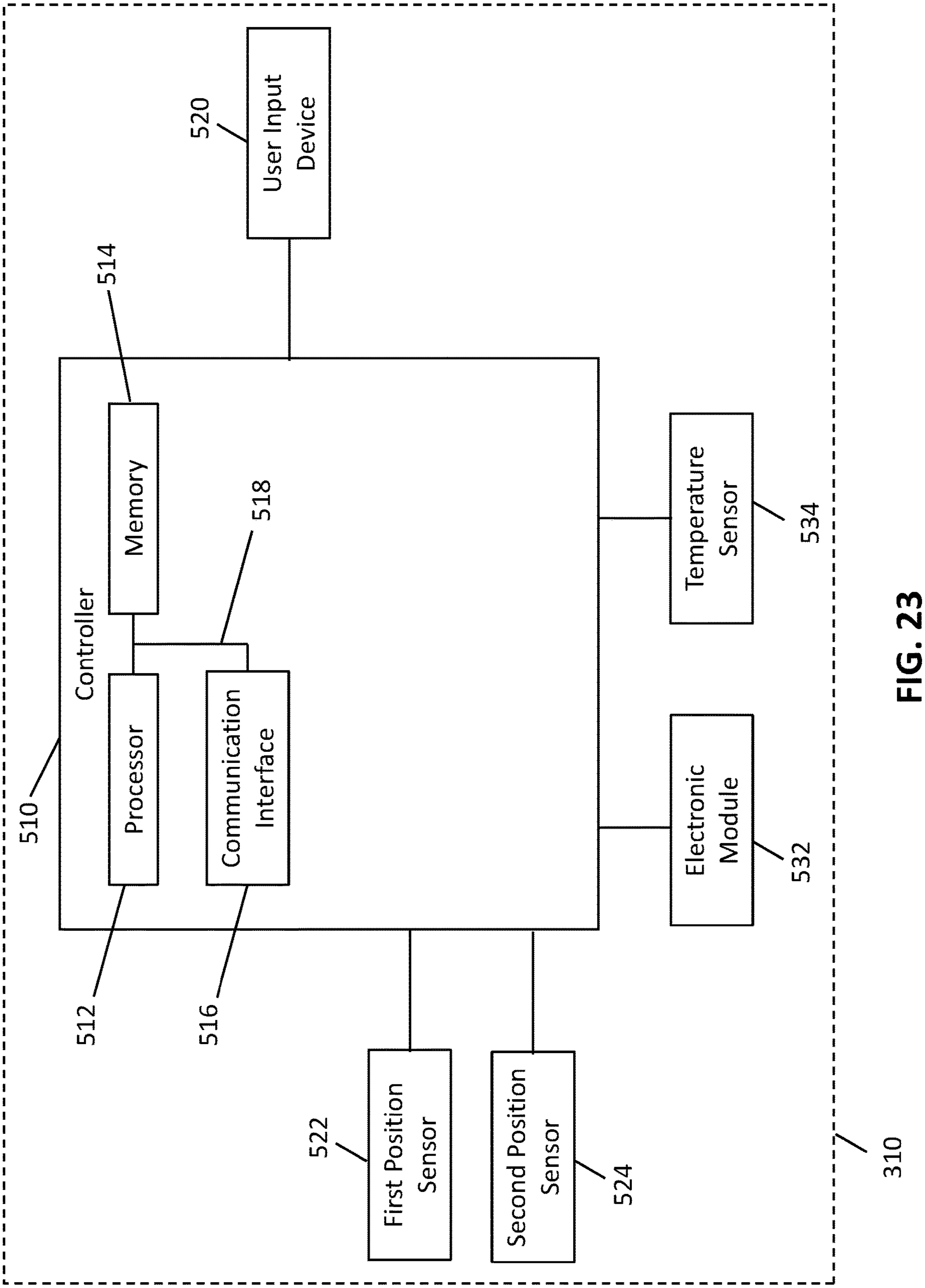
FIG. 23 is a schematic block diagram illustrating an example of a control system according to an embodiment.

FIG. 23 is a schematic diagram illustrating an example of the control system 310, according to an embodiment. The control system 310 may control movements of the boom 118 to extend or retract. In an embodiment, the control system 310 may control the actuator 214 to move the operating plate 220 from the plate neutral position $N_{OP}$ to the plate second position OP2 to move the cylinder pins 222 from the extended pin position to the retracted pin position. The control system 310 may control the boom actuator 124 to position the locking head 212 adjacent to portion of a telescope section 122 to be coupled to the locking head 212 with the coupling pins 222. The control system 310 may control the actuator 214 to move the operating plate 220 from the plate second position OP2 to the plate neutral position $N_{OP}$ to move the cylinder pins 222 from the pin retracted position to the pin extended position to engage the telescope section to be moved. The control system 310 may control the actuator 214 to move the operating plate 220 from the plate neutral position $N_{OP}$ to the plate first position OP1 to move the section lock arms 226 from the locking position to the unlocking position. The control system 310 may control the boom actuator 124 to extend or retract to cause the telescope section 122 to be moved to extend or retract. The control system 310 may control the actuator 214 to move the operating plate 220 from the plate first position OP1 to the plate neutral position $N_{OP}$ to move the section lock arms 226 from the unlocking position to the locking position.

In an embodiment, the control system 310 may also be operably connected to the auxiliary drive device such as auxiliary actuator 256. Accordingly, the control system 310 may control movements of the operating plate 220 by controlling the auxiliary actuator 256 instead of the actuator 214.

The control system 310 may include a controller 510 having a processor 512, such as a microprocessor or other suitable computer processing device, a memory 514 and a communication interface 516 operably connected to one another, for example, on a bus 518. The processor 512 may be configured to execute program instructions and perform operations and/or control other components of the control system 310 to perform operations in response to executing the program instructions.

The memory 514 may be a computer-readable storage medium, such as a non-transitory computer-readable storage medium and may be configured to store the program instructions. The memory may include one or more memory devices each including a computer-readable storage medium.

The communication interface 516 may include a transceiver or similar device to device configured to accommodate wired or wireless communications between the control system 310 and one or more other devices communicatively connected to the control system 310.

The control system 310 may include, or be operably connected to, other devices, such as a user input device 520 via which an operator may provide an instruction to the control system 310. The user input device 520 may be, for example, a joystick, lever, button, knob, wheel, switch, slider, touchscreen display, microphone, camera, sensor, keypad, keyboard, pointing device, directional arrow keys, or the like, including combinations thereof.

Accordingly, the controller 510 may be configured to receive an operator instruction via the user input device 520. In an embodiment, the operator instruction may be a boom extend/retract instruction to extend or retract the boom 118. The control system 310 may control operations of the boom actuator 124 and/or the actuator 214, for example, as described above, in response to receiving the boom extend/retract instruction.

In an embodiment, the control system 310 may include, or be operably connected to, one or more sensors. In an embodiment, the one or more sensors may include a first sensor 522, a second sensor 524, or both. The one or more sensors may include one or more position sensors. In an embodiment, the one or more sensors may be configured to detect a position of the operating plate 220.

In an embodiment, the one or more sensors may be operably connected to the controller 510. The one or more sensors may provide a signal to the controller 510 which may be processed by the controller 510 to determine a position of the operating plate 220. Accordingly, the position of the operating plate 220 may be detected.

Figure 24:
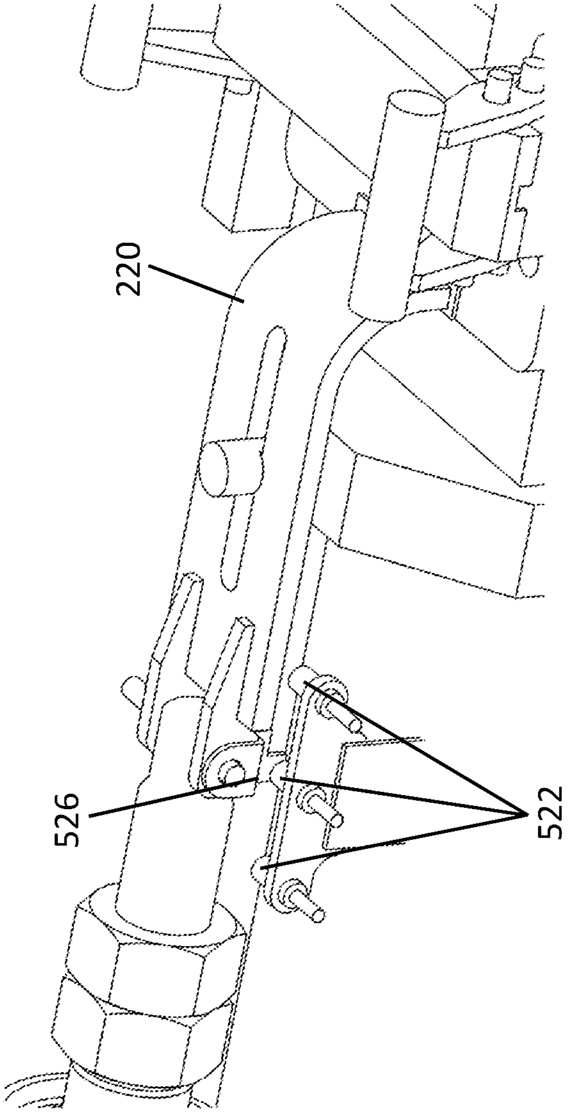
FIG. 24 is an enlarged perspective view illustrating an example of a position sensor according to an embodiment.

With reference to FIG. 24, in an embodiment, the first sensor 522 may include a plurality of proximity switches 522. In an embodiment, the plurality of proximity switches 522 may include a first proximity switch, a second proximity switch and a third proximity switch positioned to be actuated in response to the operating plate 220 moving to the plate first position OP1, the plate neutral position $N_{OP}$, and the plate second position OP2, respectively. The proximity switches may be actuated by a target 526 on the operating plate 220. In one embodiment, the controller 510 may store position information associating each proximity switch 522 with a corresponding position of the operating plate 220. Accordingly, in response to receiving a signal from a particular proximity switch, the controller 510 may determine a corresponding position of the operating plate 220 based on the stored position information.

Figure 25:
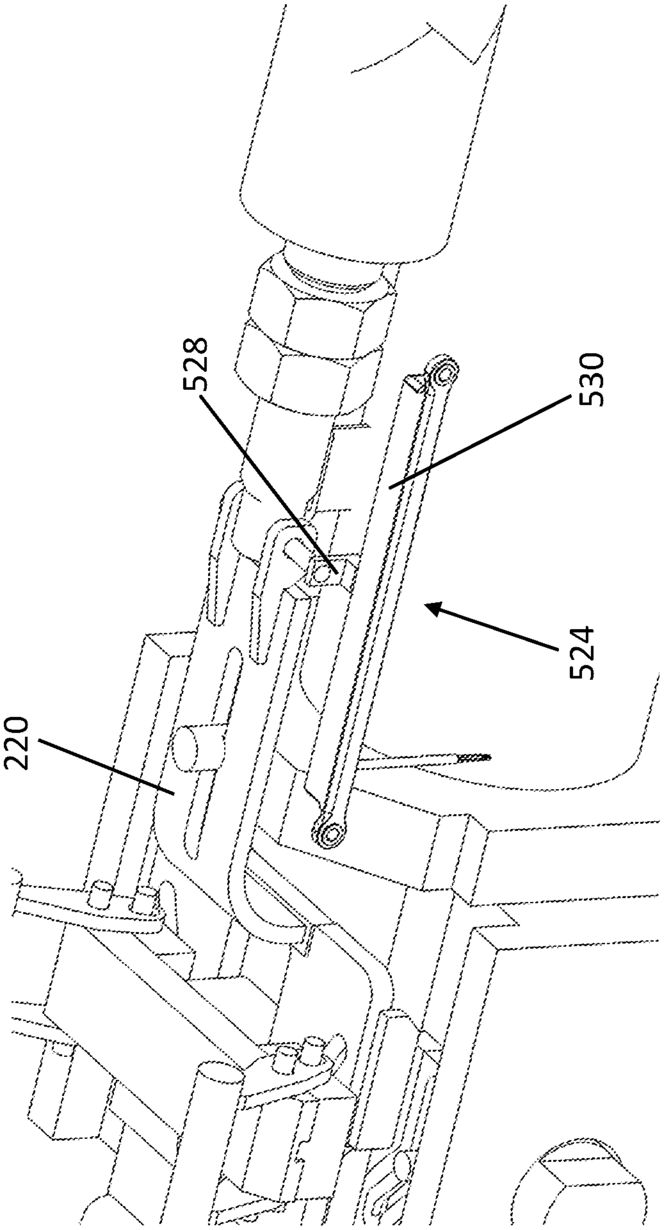
FIG. 25 is an enlarged perspective view illustrating another example of a position sensor according to an embodiment.

With reference to FIG. 25, in an embodiment, the second sensor 524 may be a linear position sensor 524. In an embodiment, the linear position sensor 524 may include a moving part 528 configured to move with the operating plate 220. The moving part 528 may be moved relative to a base part 530 of the linear position sensor 524. In an embodiment, the moving part 528 may be a magnetic target 528 movable with the operating plate 220, and the base part 530 may be an elongated magnetic sensor part 530. The linear position sensor 524 may provide a signal to the controller 510 indicative of a position of the moving part 528 relative to the base part 530. The controller 510 may store position information associating a relative position of the moving part 528 and the base part 530 to a position of the operating plate 220. The controller 510 may determine a position of the operating plate 220 based on the position information.

In the first operating condition, the control system 310, via the controller 510, may also determine a position of the cylinder pins 222 and/or the section lock arms 226 based on the position of the operating plate 220. For example, the controller 510 may store pin position information indicative of an expected pin position corresponding to the determined position of the operating plate 220. For example, pin position information may indicate that the cylinder pins 222 are expected to be in the extended pin position when the operating plate 220 is in the plate neutral position $N_{OP}$ or the plate first position OP1. The pin position information may also indicate that the cylinder pins 222 are expected to be in the retracted pin position when the operating plate 220 is in the plate second position OP2.

Similarly, the control system 310, via the controller 510, may store arm position information indicative of an expected section lock arm position corresponding to the determined position of the operating plate 220. For example, arm position information may indicate that the section lock arms 226 are expected to be in the locking position when the operating plate 220 is in the plate neutral position $N_{OP}$ or the plate second position OP2. The arm position information may also indicate that the section lock arms 226 are expected to be in the unlocking position when the operating plate 220 is in the plate first position OP1.

The control system 310, via the controller 510, may also be configured to determine whether movement of the cylinder pins 222 and/or the section arms 226 is inhibited. For example, the control system 310 may be configured to receive, through the user input device 520, a boom extend/retract instruction. In response to the boom extend/retract instruction, the control system 310 may be configured to control the locking head assembly 210 and the boom actuator 124 to extend or retract a telescope section 122 according to the boom extend/retract instruction.

For example, the control system 310, via the controller 510, may control the boom actuator 124 to perform a predetermined sequence of operations. In an embodiment, the predetermined sequence of operations may be performed in the first operating condition and may include, for example, controlling the hydraulic rod-cylinder assembly to position the locking head 212 adjacent to a portion of a telescoping section 122 to be engaged with the cylinder pins 222, controlling the actuator 214 to move the operating plate 220 to move the cylinder pins 222 to the extended pin position to engage a telescope section 122 to be moved, controlling the actuator 214 to move the operating plate 220 to move the section lock arms 226 to the unlocking position, controlling the hydraulic rod-cylinder assembly to extend or retract to the telescope section 122 to be moved, controlling the actuator 214 to move the operating plate 220 to move the section lock arms to the locking position, controlling the actuator 214 to move the operating plate 220 to move the cylinder pins to the pin retracted position, and controlling the hydraulic rod-cylinder assembly to move the locking head assembly 210 relative to the boom sections, for example, for repositioning to move another telescope section.

However, in the event movement of the cylinder pins 222 and/or section lock arms 226 is inhibited, movement of the operating plate 220 may be inhibited as well. Accordingly, if the control system 310 determines that the operating plate 220 has not moved or is not positioned as expected, then the control system 310 may determine that movement of the cylinder pins 222 and/or the section lock arms 226 is inhibited. For example, in response to receiving a boom extend/retract instruction, the control system 310 may determine a position of the operating plate 220, control the actuator 214 to move the operating plate 220 to move the cylinder pins 222 or the section pins 226, and determine a position of the operating plate 220 during and/or after the actuator 214 operation to move the operating plate 220. If the control system 310 determines that the position of the operating plate 220 has not changed after operation of the actuator 214, the control system 310 may determine that movement of the cylinder pins 222 or section lock arms 226 is inhibited, depending on the intended movement of the operating plate 220.

If the control system 310 determines that movement of the cylinder pins 222 and/or section lock arms 226 is inhibited, the control system 310 may control the boom actuator 124 to perform one or more corrective operations. The corrective operations may include, for example, relatively short extend and/or retract operations. The corrective operations may move the cylinder pins 222 and/or the section lock arms 226 relative to an adjacent boom section 122 and may provide adequate clearance to allow for movement of the cylinder pins 222 and/or section lock arms 226.

As described above, the motion mitigator 216 may be moved to a loaded condition in the event movement of the cylinder pins 222 and/or section lock arms 226, and in turn, the operating plate 220, is inhibited. When adequate clearance is provided through a corrective operation, a force from the motion mitigator 216, in a loaded condition, and applied to the operating plate 220, may cause the operating plate to move to its intended position. Movement of the operating plate 220 under a biasing force from the motion mitigator 216 may cause corresponding movements of the cylinder pins 222 and/or the section lock arms 226.

Figure 26:
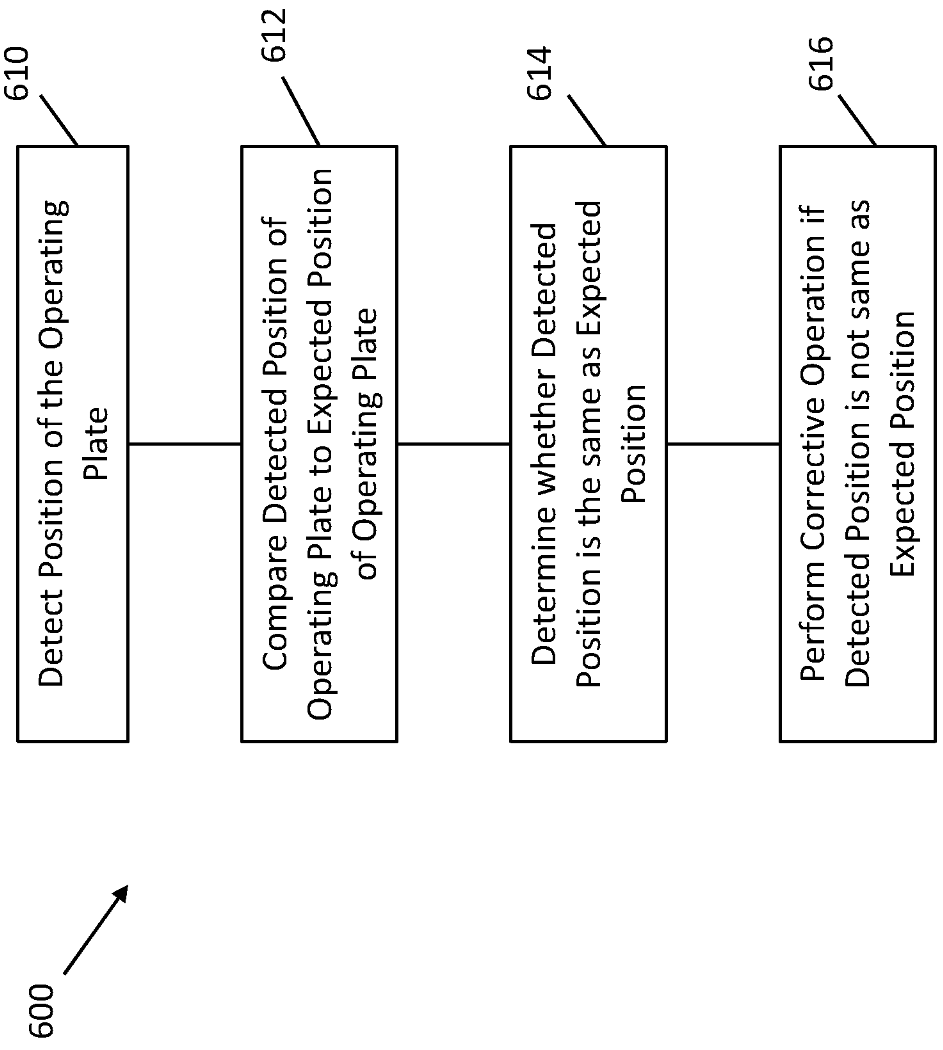
FIG. 26 is a block diagram illustrating an example of a method for controlling a boom actuator according to an embodiment.

FIG. 26 is a diagram illustrating an example of a method of controlling a boom actuator to operate a telescoping boom, according to an embodiment. The method 600 may include, at 610, detecting a position of the operating plate 220. At 612, the method may include comparing the detected position of the operating plate 220 with an expected position of the operating plate 220. At 614, the method may include determining whether the detected position of the operating plate 220 is the same as the expected position of the operating plate 220. At 616, if the detected position of the operating plate 220 is not the same as the expected position of the operating plate 220, the method may include performing a corrective operation with the boom actuator 124 until the operating plate 220 is detected at the expected position, wherein the operating plate 220 moves to the expected position under a biasing force from the motion mitigator 216. In an embodiment, the method may be used with the boom actuator 124, the locking head assembly 210 and the control system 310 described herein.

At 610, the control system 310 may detect the position of the operating plate 220 based on one or more signals received from the one or more sensors, such as the first sensor 522 and/or the second sensor 524. In an embodiment, the detected position of the operating plate 220 may be, for example, the plate first position OP1, the plate neutral position $N_{OP}$, or the plate second position OP2.

At 612, the control system 310 may compare the detected position of the operating plate 220 to an expected position of the operating plate 220. The expected position of the operating plate 220 may be stored, for example, in the memory 514. An expected position may be, for example, the plate first position OP1, the plate neutral position $N_{OP}$, or the plate second position OP2. The control system 310 may select the expected position to which the detected position is compared based on, for example, the intended movement of the operating plate 220 in response to operation of the actuator 214 and/or the intended operation of the cylinder pins 222 and/or the section lock arms 226. For example, in an embodiment, if the intended operation is to move the cylinder pins 222 to the retracted pin position, the control system 310 may determine that the expected position is the plate second position OP2. Accordingly, in an embodiment, the control system 310 may compare the detected position of the operating plate 220 to the expected position, i.e., the plate second position OP2, in this example. The intended operation may be determined based on, for example, a user instruction or identifying the intended operation in a predetermined sequence of operations.

At 614, the control system 310 may determine whether the detected position of the operating plate 220 is the same as the expected position, based on the comparison performed at 612. If the detected position of the operating plate 220 is the same as the expected position, the control system 310 may continue operating the boom actuator 124 in accordance with a predetermine sequence of operations.

At 616, if the detected position of the operating plate 220 is not the same as the expected position, the control system 310 may operate boom actuator 124 to perform one or more corrective operations. The corrective operations may be corrective movements such as relatively small extensions and/or retractions which cause the locking head 212 to move relative to an adjacent telescope section 122 of the boom 118. For example, the control system 310 may control the cylinder 128 of the hydraulic rod-cylinder assembly to extend and/or retract relative to the rod 126 in a series of relatively short, alternating movements to cause the cylinder pins 222 and/or section lock arms 226 to move corresponding relatively short distances relative to an adjacent boom section. The relatively small movements may move the cylinder pins 222 and/or section lock arms 226 to a position where they are free to move. Accordingly, when the cylinder pins 222 and/or section arms 226 are moved in a corrective movement of the boom actuator 124 to a position where they are free to move, the operating plate 220 may be moved to the expected position under the biasing force of the motion mitigator 216. The control system 310 may then detect that the operating plate 220 is in the expected position and continue with the predetermined sequence of operations.

In an embodiment, the corrective operations may be performed until the control system detects the operating plate 220 in the expected position. In an embodiment, the control system 310 may detect the position of the operating plate 220 at predetermined time intervals or at a time just before operating the actuator 214 and just after operating the actuator 214. That is, control system 310 may monitor the position of the operating plate 220. In an embodiment, the control system 310 may receive a boom extend/retract instruction via the user input device 520 and initiate the predetermined sequence of operations in response to receiving the boom extend/retract instructions. The predetermined sequence of operations may include a sequence of operations for extending or retracting a telescope section 122 in the first operating condition, i.e., when movement of the cylinder pins 222 and the section lock arms 226 are not inhibited. In an embodiment, the operations of the control system 310 described above may be performed by the controller 510 and/or in response to the controller 510 executing program instructions.

In an embodiment, the control system 310 may also be operably connected to the auxiliary actuator 256 and may be configured to control movements of the auxiliary actuator 256. As described above, the auxiliary actuator 256 may be operated to control movements of the operating plate 220 in the event the operations of the actuator 214 are ceased. Operations of the actuator 214 may cease with the drive arm 236 at or between any of the drive arm positions, i.e., the drive arm first position DA1, the drive arm neutral position $N_{DA}$, and the drive arm second position DA2. To this end, the control system 310 may be configured to control the auxiliary actuator 256 to position the auxiliary drive arm 260 such that the operating plate 220 is disposed at one of the plate first position OP1, plate neutral position $N_{OP}$, and plate second position OP2. The control system 310 may also be configured to move the auxiliary drive arm 260 to move the operating plate 220 between the plate first position OP1, the plate neutral position $N_{OP}$ and the plate second position OP2.

For example, in an embodiment, if operation of the actuator 214 is ceased, the control system 310 may operate the auxiliary actuator 256 to move the auxiliary drive arm 260 until the operating plate 220 is detected by the one or more sensors 522, 524 at one of the plate first position OP1, the plate neutral position NOP, and the plate second position OP2. The control system 310 may then operate the auxiliary actuator 256 to move the operating plate 220 known distances between the plate first position OP1, the plate neutral position NOP, and the plate second position OP2.

In an embodiment, the actuator 214 may be connected to the control system 310 on a bus. The bus may be a CAN bus. In an embodiment, actuator 214 may be configured to provide information to the control system 310 via the bus. In an embodiment, information provided by the actuator 214 may be information indicative of fault. Fault information may be provided, for example, if the actuator 214 has become stuck (thereby ceasing operations) or overloaded. Fault information may be indicative of other conditions as well. In this manner, the control system 310 provide fault information to a technician. The auxiliary actuator 256 may be connected to the control system 310 and provide fault information to the control system 310 in a similar manner.

Referring again to FIG. 23, in an embodiment, an electronic module 532 may be provided on the boom actuator 124. The electronic module 532 may be part of or operably connected to the control system 310. The actuator 214 may be operably connected to the electronic module 532. In an embodiment, the auxiliary actuator 256 may be connected to the electronic module 532 as well. The electronic module 532 may be configured to monitor the electric current being drawn by the actuator 214. The control system 310 may receive information indicative of the electric current drawn by actuator 214 from the electronic module 532. The control system 310 may control operation of the actuator 214 based on the information indicative of the electric current. For example, in response to receiving information indicative of the electric current indicating that actuator 214 is drawing too much current, the control system 310 may control the actuator 214 to slow down an operating speed of the actuator 214. The auxiliary actuator 256 may be operably connected to the electronic module 532 and may be operated by the control system 310 based on information indicative of electric current being drawn in a similar manner.

In an embodiment, the control system 310 may be configured to monitor a temperature of the locking head assembly 210, including, for example, the temperature of individual components of the locking head assembly 210. Electric current drawn by electrical components of the locking head assembly 210, such as the actuator 214, may be affected by temperature. Accordingly, in an embodiment, the control system 310 may be operably connected to one or more temperature sensors 534 and may receive temperature information from the one or more temperature sensors 534. The control system 310 may control operation of one or more electrical components of the locking head assembly 210, such as the actuator 214 and/or auxiliary actuator 256, based on the received temperature information. For instance, the control system 310 may be configured to adjust a speed of the actuator 214 or the maximum allowed electrical current sent to the actuator 214 in response to the temperature information.

It is understood that various features from any of the embodiments above are usable together with the other embodiments described herein.

All patents referred to herein, are hereby incorporated herein by reference, whether or not specifically done so within the text of this disclosure.

In the present disclosure, the words “a” or “an” are to be taken to include both the singular and the plural. Conversely, any reference to plural items shall, where appropriate, include the singular. In addition, it is understood that terminology referring to orientation of various components, such as “upper” or “lower” is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A locking head assembly for a telescoping boom, the locking head assembly comprising:

a locking head comprising a base, an operating plate operably coupled to the base, one or more cylinder pins and/or one or more section lock arms operably coupled to the operating plate and movable in response to movement of the operating plate relative to the base;

an actuator operably coupled to the operating plate and configured to move the operating plate relative to the base, the actuator comprising a motor and a drive arm, wherein the motor is configured to drive the drive arm between a drive arm first position and a drive arm second position; and a motion mitigator operably coupled to the locking head and the actuator, the motion mitigator comprising a housing, a rod disposed at least partially within the housing, and a biasing device disposed between the rod and the housing, wherein the motion mitigator is disposed between and connected to the operating plate and the drive arm.

2. The locking head assembly of claim 1, wherein:

the one or more cylinder pins are movable between a retracted pin position and an extended pin position in response to movement of the operating plate relative to the base; and the one or more section lock arms are movable between a locking position and an unlocking position in response to movement of the operating plate relative to the base.

3. The locking head assembly of claim 1, wherein the motion mitigator is disposed between, and connected to the operating plate and the drive arm.

4. The locking head assembly of claim 3, wherein the motion mitigator is in a rigid condition when the operating plate moves in response to movement of the drive arm.

5. The locking head assembly of claim 3, wherein the motion mitigator is in a first loaded condition when movement of the operating plate in a first direction is inhibited in response to movement of the drive arm in the first direction.

6. The locking head assembly of claim 5, wherein the rod is in a retracted position relative to the housing and the biasing device urges the operating plate in the first direction when the motion mitigator is in the first loaded condition.

7. The locking head assembly of claim 3, wherein the motion mitigator is in a second loaded condition when movement of the operating plate in a second direction is inhibited in response to movement of the drive arm in the second direction.

8. The locking head assembly of claim 7, wherein the rod is in an extended position relative to the housing and the biasing device urges the operating plate in the second direction when the motion mitigator is in the second loaded condition.

9. The locking head assembly of claim 1, further comprising an auxiliary drive device actuator connected to the actuator.

10. The locking head assembly of claim 9, wherein the auxiliary drive device is an auxiliary actuator comprising an auxiliary motor and an auxiliary drive arm, and the actuator is mounted on a track and configured for translational movement relative to the track in response to movement of the auxiliary drive arm.

11. A telescoping boom for a crane, the telescoping boom comprising:

a base section;

a plurality of telescope sections movable relative to the base section to adjust a length of the boom;

a boom actuator disposed within the base section operable to move a telescope section of the plurality of telescope sections to adjust the length of the boom; and a locking head assembly connected to the boom actuator, the locking head assembly comprising:

a locking head comprising a base, an operating plate operably coupled to the base, one or more cylinder pins and/or one or more section lock arms operably coupled to and movable in response to movement of the operating plate relative to the base;

an actuator operably coupled to the operating plate and configured to move the operating plate relative to the base, the actuator comprising a motor and a drive arm, wherein the motor is configured to drive the drive arm between an arm first position and an arm second position; and a motion mitigator operably coupled to the locking head and the actuator, the motion mitigator comprising a housing, a rod disposed at least partially within the housing, and a biasing device disposed between the rod and the housing, wherein the motion mitigator is disposed between and connected to the operating plate and the drive arm.

12. The telescoping boom of claim 11, wherein:

the one or more cylinder pins are movable between a retracted pin position and an extended pin position in response to movement of the operating plate relative to the base; and the one or more section lock arms are movable between a locking position and an unlocking position in response to movement of the operating plate relative to the base.

13. The telescoping boom of claim 11, wherein the motion mitigator is in a rigid condition when the operating plate moves in response to movement of the drive arm.

14. The telescoping boom of claim 11, wherein the motion mitigator is in a first loaded condition when movement of the operating plate in the first direction is inhibited in response to movement of the drive arm in the first direction.

15. The telescoping boom of claim 11, wherein the motion mitigator is in a second loaded condition when movement of the operating plate in the second direction is inhibited in response to movement of the drive arm in the second direction.

16. A crane comprising:

a carrier;

a superstructure mounted on the carrier, the superstructure having a telescoping boom comprising:

a base section;

a plurality of telescope sections movable relative to the base section to adjust a length of the boom; and a boom actuator disposed within the base section operable to move a telescope section of the plurality of telescope sections to adjust the length of the boom;

a locking head connected to the boom actuator, the locking head comprising a base, an operating plate operably coupled to the base, one or more cylinder pins and/or one or more section lock arms operably coupled to the operating plate and movable in response to movement of the operating plate relative to the base;

an actuator operably mounted on the boom actuator, coupled to the operating plate, and configured to move the operating plate relative to the base, the actuator comprising a motor and a drive arm, wherein the motor is configured to drive the drive arm between an arm first position and an arm second position; and a motion mitigator operably coupled to the locking head and the actuator, the motion mitigator comprising a housing, a rod disposed at least partially within the housing, and a biasing device disposed between the rod and the housing, wherein the motion mitigator is disposed between and connected to the operating plate and the drive arm.

17. The crane of claim 16, wherein:

the one or more cylinder pins are movable between a retracted pin position and an extended pin position in response to movement of the operating plate relative to the base; and the one or more section lock arms are movable between a locking position and an unlocking position in response to movement of the operating plate relative to the base.

18. The crane of claim 16, wherein the motion mitigator is in a rigid condition when the operating plate moves in response to movement of the drive arm.

19. The crane of claim 16, wherein the motion mitigator is in a first loaded condition when movement of the operating plate in the first direction is inhibited in response to movement of the drive arm in the first direction.

20. The crane of claim 16, wherein the motion mitigator is in a second loaded condition when movement of the operating plate in the second direction is inhibited in response to movement of the drive arm in the second direction.

21. A method for controlling a boom actuator of a telescoping boom, the boom actuator comprising a hydraulic rod-cylinder assembly and a locking head assembly, the locking head assembly having a base, an operating plate operably coupled to the base, one or more cylinder pins and/or one or more section lock arms operably coupled to and movable in response to movement of the operating plate relative to the base, the method comprising:

detecting, with one or more position sensors, a position of the operating plate;

comparing, by a controller, the detected position of the operating plate with an expected position of the operating plate;

determining, by the controller, whether the detected position of the operating plate is the same as the expected position of the operating plate; and if the detected position of the operating plate is not the same as the expected position of the operating plate, controlling the hydraulic rod-cylinder assembly to perform a corrective operation until the operating plate is detected at the expected position, wherein the operating plate moves to the expected position under a biasing force from a motion mitigator operably coupled to and disposed between the operating plate and a drive arm of an actuator configured to move the operating plate relative to a base.

* * * * *